(12) United States Patent
Chiffey et al.

(10) Patent No.: US 11,103,855 B2
(45) Date of Patent: Aug. 31, 2021

(54) CATALYST WITH STABLE NITRIC OXIDE (NO) OXIDATION PERFORMANCE

(71) Applicant: Johnson Matthey Public Limited Company, London (GB)

(72) Inventors: Andrew Francis Chiffey, Ware (GB); Daniel Hatcher, Royston (GB); Francois Moreau, Cambridge (GB); Paul Richard Phillips, Royston (GB); Freyja Woods, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/043,665

(22) Filed: Feb. 15, 2016

(65) Prior Publication Data

US 2016/0236178 A1 Aug. 18, 2016

(30) Foreign Application Priority Data

Feb. 16, 2015 (GB) .................................. 1502538

(51) Int. Cl.
*B01J 23/42* (2006.01)
*B01J 37/08* (2006.01)
(Continued)

(52) U.S. Cl.
CPC ............ *B01J 23/42* (2013.01); *B01D 53/944* (2013.01); *B01D 53/9418* (2013.01); *B01D 53/9477* (2013.01); *B01J 23/44* (2013.01); *B01J 35/0006* (2013.01); *B01J 35/006* (2013.01); *B01J 37/0201* (2013.01); *B01J 37/0244* (2013.01); *B01J 37/0248* (2013.01); *B01J 37/08* (2013.01); *B01J 37/16* (2013.01); *F01N 3/0231* (2013.01); *F01N 3/035* (2013.01); *F01N 3/2066* (2013.01); *B01D 2255/1021* (2013.01); *B01D 2255/1023* (2013.01); *B01D 2255/2092* (2013.01);
(Continued)

(58) Field of Classification Search
None
See application file for complete search history.

(56) References Cited

U.S. PATENT DOCUMENTS

| 5,045,519 A | 9/1991 | Meyer et al. |
| 5,997,830 A | 12/1999 | Itoh et al. |

(Continued)

FOREIGN PATENT DOCUMENTS

| GB | 1449313 | 9/1976 |
| JP | S58199043 | 11/1983 |

(Continued)

OTHER PUBLICATIONS

Okada et al. JP4919309B2—translated document (2012).*

(Continued)

*Primary Examiner* — Jelitza M Perez

(57) ABSTRACT

A method of preparing a catalyst composition for producing a stable ratio of $NO_2$ to NO in an exhaust system of a compression ignition engine is described. The method comprises: (i) preparing a first composition comprising a platinum (Pt) compound disposed or supported on a support material; (ii) preparing a second composition by reducing the platinum (Pt) compound to platinum (Pt) with a reducing agent; and (iii) heating the second composition to at least 650° C.

9 Claims, 3 Drawing Sheets

(51) Int. Cl.

| | | |
|---|---|---|
| *B01J 37/16* | (2006.01) | |
| *B01J 37/02* | (2006.01) | |
| *B01D 53/94* | (2006.01) | |
| *F01N 3/20* | (2006.01) | |
| *F01N 3/035* | (2006.01) | |
| *F01N 3/023* | (2006.01) | |
| *B01J 23/44* | (2006.01) | |
| *B01J 35/00* | (2006.01) | |

(52) U.S. Cl.
CPC ...... *B01D 2255/30* (2013.01); *B01D 2255/92* (2013.01); *F01N 2250/02* (2013.01); *F01N 2370/04* (2013.01); *Y02A 50/20* (2018.01); *Y02T 10/12* (2013.01)

(56) References Cited

U.S. PATENT DOCUMENTS

| | | | |
|---|---|---|---|
| 6,599,570 | B1 | 7/2003 | Aderhold et al. |
| 7,998,424 | B2 | 8/2011 | Bergeal et al. |
| 8,449,852 | B1* | 5/2013 | Sung .................... B01D 53/944 423/213.5 |
| 8,568,674 | B1* | 10/2013 | Sung .................... B01J 37/0246 423/213.2 |
| 8,603,432 | B2 | 12/2013 | Andersen et al. |
| 8,679,434 | B1 | 3/2014 | Li et al. |
| 8,703,236 | B2 | 4/2014 | Chandler et al. |
| 8,859,454 | B2 | 10/2014 | Bentele et al. |
| 2007/0244001 | A1 | 10/2007 | Wakamatsu et al. |
| 2008/0045405 | A1* | 2/2008 | Beutel .................... B01J 23/44 502/103 |
| 2008/0125308 | A1 | 5/2008 | Fujdala et al. |
| 2009/0143224 | A1 | 6/2009 | Oudart |
| 2010/0257843 | A1* | 10/2010 | Hoke .................... B01D 53/945 60/274 |
| 2014/0271428 | A1* | 9/2014 | Gerlach ............... B01J 29/7415 423/213.5 |

FOREIGN PATENT DOCUMENTS

| | | | |
|---|---|---|---|
| JP | 4919309 B2 * | 4/2012 | .............. B01J 23/42 |
| JP | 2013034937 | 2/2013 | |
| WO | 1999047260 A1 | 9/1999 | |
| WO | 2007077462 A1 | 7/2007 | |
| WO | 2008132452 A2 | 6/2008 | |
| WO | 2011080525 A1 | 7/2011 | |
| WO | 2012120292 A1 | 9/2012 | |
| WO | 2013088133 A1 | 6/2013 | |
| WO | WO 2014184569 A1 * | 11/2014 | .......... B01J 37/0244 |

OTHER PUBLICATIONS

Ikeda Tomohiro, et. al, "Growth of Platinum Nanoparticles on Alumina", Photon Factory Activity Report 2013 #31 Part B, 2014, Proposal Nos. 2011G575,2012G586.

* cited by examiner

CATALYST WITH STABLE NITRIC OXIDE (NO) OXIDATION PERFORMANCE

FIELD OF THE INVENTION

The invention relates to a catalyst composition for stably producing $NO_2$ in an exhaust system of a compression ignition engine and to a method for its preparation. The invention also relates to an oxidation catalyst, a method for its manufacture and to an exhaust system comprising the oxidation catalyst.

BACKGROUND TO THE INVENTION

Compression ignition engines, such as diesel engines, produce an exhaust emission that generally contains at least four classes of pollutant that are legislated against by inter-governmental organisations throughout the world: carbon monoxide (CO), unburned hydrocarbons (HCs), oxides of nitrogen ($NO_x$) and particulate matter (PM). Emissions standards for compression ignition engines, particularly vehicular diesel engines, are being progressively tightened. There is a need to provide improved exhaust systems that are able to meet these standards, which are cost-effective.

Exhaust systems for compression ignition engines generally include several emissions control devices. Each emissions control device has a specialised function and is responsible for treating one or more classes of pollutant in the exhaust gas. For example, an exhaust system for a diesel engine may include (i) a diesel oxidation catalyst (DOC) for oxidising CO and HCs and (ii) a selective catalytic reduction (SCR) catalyst for reducing $NO_x$ to nitrogen ($N_2$). The interaction between each emissions control device in the exhaust system is important to the overall efficiency of the system because the performance of an upstream emissions control device can affect the performance of a downstream emissions control device.

Oxidation catalysts, such as DOCs, can oxidise some of the nitric oxide (NO) in an exhaust gas to nitrogen dioxide ($NO_2$). The generated $NO_2$ can be used to regenerate particulate matter (PM) that has been trapped, for example, by a downstream diesel particulate filter (DPF) or a downstream catalysed soot filter (CSF). The $NO_2$ generated by the oxidation catalyst can also be beneficial to the performance of selective catalytic reduction (SCR) catalyst or selective catalytic reduction filter (SCRF™) catalysts. The ratio of $NO_2$:NO in exhaust gases directly produced by compression ignition engines is generally too low for optimum SCR catalyst or SCRF™ catalyst performance and may be too low to assist in the passive regeneration of a DPF or CSF. In particular, when an oxidation catalyst, such as a DOC, is positioned in an exhaust system upstream of an SCR or SCRF™ catalyst, the $NO_2$ that is generated can alter the ratio of $NO_2$:NO in the exhaust gas in favour of optimal SCR or SCRF™ catalyst performance.

Whilst it may be advantageous to include an oxidation catalyst that has good $NO_2$ generation activity in an exhaust system, using an oxidation catalyst in this way can be problematic. The amount of $NO_2$ that is generated by an oxidation catalyst at a given exhaust gas temperature can vary considerably over its lifetime. This can compromise the performance of a downstream emissions control device and it may be necessary to formulate the downstream catalyst to accommodate the variation in oxidation catalyst performance. For exhaust systems that perform active SCR the variation in the amount of $NO_2$ can make it difficult to calibrate the dosing of the nitrogenous reductant because the dosing depends on the amount of $NO_x$ and the ratio of $NO_2$:$NO_x$.

SUMMARY OF THE INVENTION

The inventors have found a way of stabilising the $NO_2$ generating activity (i.e. the NO oxidation activity) of an oxidation catalyst, such as a DOC, over its lifetime. As a result, it is unnecessary to take into account the variation in the amount of $NO_2$ that is generated by the oxidation catalyst over its lifetime when assembling or configuring an exhaust system comprising an emissions control device, particularly a SCR catalyst or a SCRF™ catalyst, downstream of the oxidation catalyst. This allows the use of catalyst formulations on downstream emissions control devices that show excellent performance when the amount of $NO_2$ that is generated by the oxidation catalyst remains relatively constant or within a narrow operational window. It is also much simpler to calibrate the dosing of a nitrogenous reductant in exhaust systems that perform active SCR.

The invention provides a method of preparing a catalyst composition, particularly a catalyst composition for producing a stable ratio of $NO_2$ to NO in an exhaust system of compression ignition engine. The method comprises:

(i) preparing a first composition comprising a platinum (Pt) compound disposed or supported on a support material;
(ii) preparing a second composition by reducing the platinum (Pt) compound to platinum (Pt) with a reducing agent; and
(iii) heating the second composition to at least 650° C.

It is common to prepare the final catalyst composition of an oxidation catalyst in situ on the substrate during manufacture of the oxidation catalyst. The components (e.g. platinum group metal salts, refractory metal oxides etc) for making the catalyst composition are dissolved or dispersed in a solution to form a washcoat. The washcoat is coated onto a substrate, and the coated substrate is then dried and calcined. The final catalyst composition is formed in situ on a surface of the substrate during the drying and calcination steps, which typically "fix" the platinum group metal component(s) to the refractory metal oxide support material.

Catalyst compositions produced by conventional methods often show good, initial NO oxidising activity (i.e. $NO_2$ generating activity), which deteriorates as the compositions are used over a prolonged period of time (e.g. over multiple drive cycles). This deterioration in NO oxidising activity (i.e. $NO_2$ generating activity) can be quantified by the parameter $\Delta NO_{2\ (S1\ to\ S2)}$ as follows:

$$\Delta NO_{2\ (S1\ to\ S2)} = \text{amount of } NO_2 \text{ produced in } S1 - \text{amount of } NO_2 \text{ produced in } S2$$

where S2 represents a catalyst composition in a second state that has been subjected to greater usage than the catalyst composition in S1, an earlier, first state. The amount of $NO_2$ generated at a specific exhaust gas temperature by a catalyst composition can be measured using standard techniques.

Generally, $\Delta NO_{2\ (S1\ to\ S2)}$ represents the difference in $NO_2$ generating activity between a catalyst composition that has been used for the first time (i.e. S1 represents a "new" or "fresh" catalyst composition that has not been subjected to repeated, prolonged use) and the catalyst composition when it has been subjected to repeated use (i.e. S2). A problem with catalyst compositions in the prior art is that $\Delta NO_{2\ (S1\ to\ S2)}$ can be relatively large, even when the measurement at S2 is taken after the catalyst composition has been used for a relatively short period of time or has been subjected to relatively few high temperature regeneration events compared to, for example, the typical lifetime usage of the composition.

It is desirable for catalyst compositions to show a minimal change in the amount of $NO_2$ generated over their lifecycle, such that $\Delta NO_{2\ (S1\ to\ S2)}=0$ or remains as close to zero as possible (where S1 represents a "new" or "fresh" catalyst composition that has not been subjected to repeated, prolonged use).

The invention also provides a catalyst composition. The catalyst composition is suitable for producing a stable ratio of $NO_2$ to NO (i.e. $NO_2:NO_x$) in an exhaust system of compression ignition engine.

The invention provides a catalyst composition, and a method of preparing the catalyst composition, whereby the $\Delta NO_{2\ (S1\ to\ S2)}$ for the catalyst composition is very small [e.g. where S1 represents a catalyst composition that has been used for the first time and S2 represents a catalyst composition that has been subjected to repeated usage].

In general, the catalyst composition of the invention comprises platinum (Pt) disposed or supported on a support material.

The catalyst composition of the invention may be obtained or obtainable from the method of the invention. The catalyst composition is typically directly obtained or directly obtainable from the method.

Additionally or alternatively, the platinum (Pt) has a mean crystallite size of 10 to 35 nm.

As mentioned above, the catalyst composition of the invention has been found to retain its NO oxidation activity (i.e. $NO_2$ generating performance) even after prolonged, repeated use, such that $\Delta NO_{2\ (S1\ to\ S2)}$ is very small. In addition to $\Delta NO_{2\ (S1\ to\ S2)}$ being very small, the catalyst composition of the invention also has excellent NO oxidation activity (i.e. the absolute amount of $NO_2$ generated is high).

A further aspect of the invention relates to an oxidation catalyst comprising the catalyst composition of the invention disposed on a substrate. The oxidation catalyst is suitable for treating an exhaust gas from a compression ignition engine (e.g. exhaust gas directly from the compression ignition engine) and/or for the active regeneration of an emissions control device comprising a filtering substrate. The reference to "treating an exhaust gas from a compression ignition engine" refers to oxidising carbon monoxide (CO), hydrocarbons (HCs) and nitric oxide (NO) in an exhaust gas from a compression ignition engine.

The invention further provides a method of manufacturing an oxidation catalyst of the invention. The method comprises:
(i) preparing a washcoat comprising the catalyst composition of the invention; and
(ii) applying the washcoat to a substrate.

The oxidation catalyst of the invention is particularly suitable for use with a SCR catalyst or a SCRF™ catalyst, particularly a SCR catalyst or a SCRF™ catalyst comprising a transition metal exchanged zeolite (e.g. a copper exchanged zeolite or an iron exchanged zeolite), or in the active regeneration of an emissions control device comprising a filtering substrate.

The invention provides an exhaust system for a compression ignition engine. The exhaust system comprises an oxidation catalyst of the invention and an emissions control device.

The invention further provides a vehicle comprising a compression ignition engine and either an oxidation catalyst of the invention or an exhaust system of the invention.

Another aspect of the invention relates to a method of stably generating $NO_2$ in an exhaust gas from a compression ignition engine for an emissions control device, which method comprises: (a) contacting the exhaust gas with a catalyst composition or an oxidation catalyst of the invention to produce a treated exhaust gas; and (b) passing the treated exhaust gas to an emissions control device.

The invention further relates to the use of the catalyst composition or the oxidation catalyst to stably generate or stably produce $NO_2$ in an exhaust gas from a compression ignition engine for an emissions control device (e.g. downstream emissions control device).

The invention also relates to the use of a catalyst composition or an oxidation catalyst of the invention in the regeneration of an emissions control device having a filtering substrate (e.g. a downstream emissions control device having a filtering substrate). The regeneration of the emissions control device may be "passive" or "active".

DETAILED DESCRIPTION OF THE INVENTION

Figure 1:
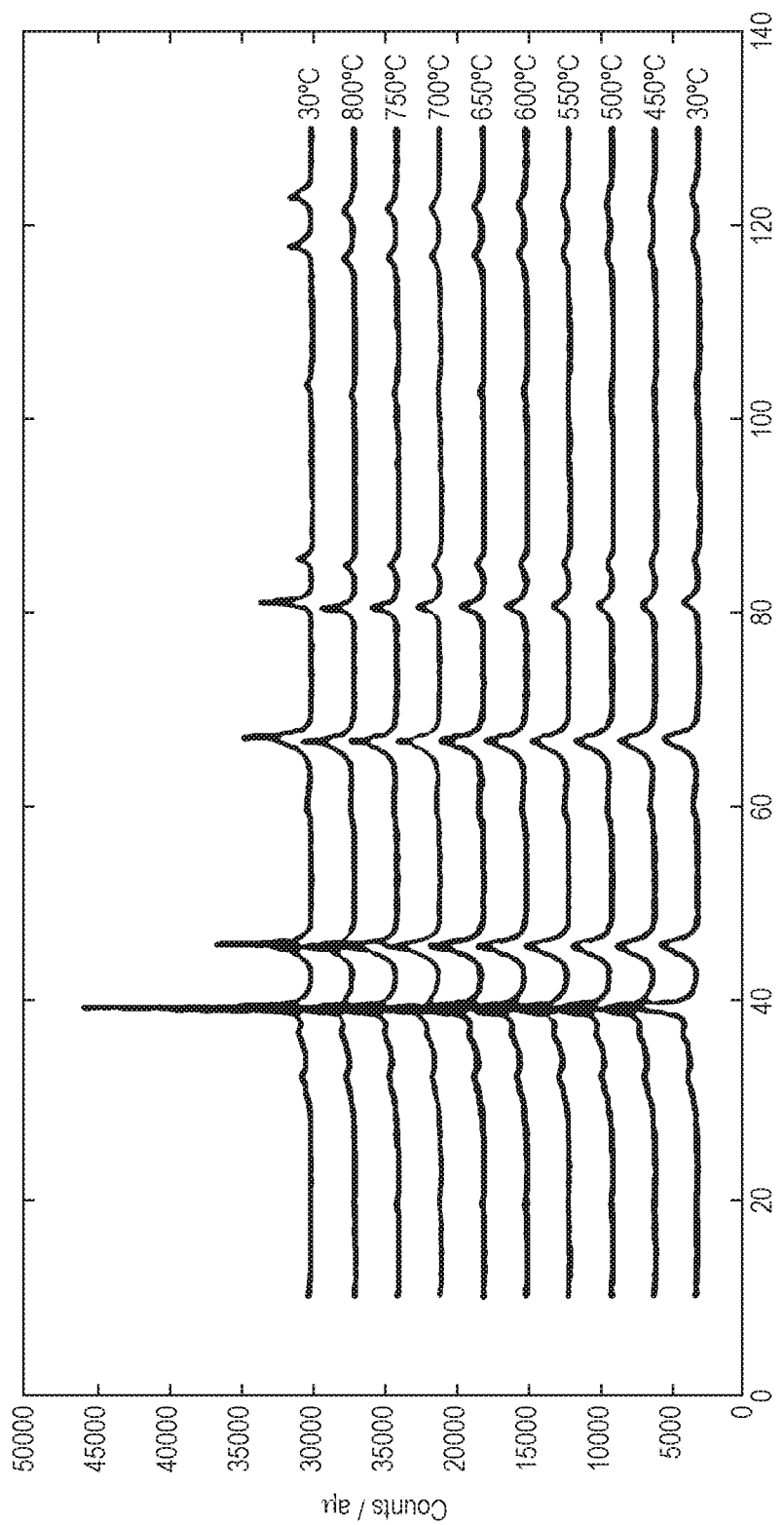
FIG. 1 shows X-ray diffraction (XRD) diffractogram at various temperatures (at 30° C., 450° C., 500° C., 550° C., 600° C., 650° C., 700° C., 750° C., 800° C. and then 30° C.) for the catalyst composition of Example 4.

It has surprisingly been found that it is possible to produce a catalyst composition that can stably generate $NO_2$ (e.g. over the lifetime of an oxidation catalyst). The stabilisation in the $NO_2$ generating activity of the catalyst composition can be obtained without substantially deteriorating or reducing the initial NO oxidation activity of the catalyst composition. The catalyst composition of the invention has a relatively small $\Delta NO_{2\ (S1\ to\ S2)}$ (where S1 represents the initial, fresh state of the catalyst composition and S2 represents a catalyst composition that has been subjected to repeated and prolonged use) compared to compositions prepared by conventional methods. This means that the difference between the amount of $NO_2$ generated after the catalyst composition of the invention has been freshly applied to a substrate compared to when the catalyst composition is in an older, aged state is relatively small.

Generally, the method of the invention comprises, or consists of, the following steps:
(i) preparing a first composition comprising a platinum (Pt) compound disposed or supported on a support material;
(ii) preparing a second composition by reducing the platinum (Pt) compound to platinum (Pt) with a reducing agent; and
(ii) heating the second composition to at least 650° C.

In principle, any conventional method could be used in the step of (i) preparing a first composition comprising a platinum (Pt) compound disposed or supported on a support material. The first composition may, for example, have the same formulation as a conventional washcoat for an oxidation catalyst that has been coated onto a substrate and before the coated substrate has been dried and calcined.

Step (i) may be a step of (i) preparing a first composition comprising a platinum (Pt) compound disposed or supported on a support material by an incipient-wetness method, a deposition-precipitation method or a co-precipitation method. Such methods are known in the art. It is preferred that step (i) is a step of (i) preparing a first composition comprising a platinum (Pt) compound disposed or supported on a support material by an incipient-wetness method.

In the method of preparing a catalyst composition of the invention, step (i) is typically a step of (i) preparing a first composition in solid form. Thus, step (i) is preferably a step of (i) preparing a first composition in solid form by removing liquid from the first composition and/or drying the first composition. The removing liquid from, or the drying of, the first composition may be by freeze drying and/or heating (i.e. to evaporate excess liquid from the first composition).

When removing liquid from the first composition by heating, then typically the first composition is heated to a temperature of 200° C. or less, preferably 150° C. or less. For the avoidance of doubt, the step of heating the first composition to dry the first composition is not a step of calcining the first composition.

The step of drying and/or removing the excess liquid from the first composition fixes the Pt compound (and any other PGM, including Pt in an elemental form, or PGM compound that may be present) onto the support material. This prevents the Pt compound (and any other PGM, including Pt in an elemental form, or PGM compound that may be present) from re-entering the solution phase (e.g. as a dispersion or solution) by becoming separated from the support material. Fixing the Pt compound (and any other PGM, including Pt in an elemental form, or PGM compound that may be present) in this way avoids the formation of large Pt (and other PGM) crystallites that can affect the activity of the catalyst composition.

Generally, the first composition comprises, or consists essentially of, a plurality of catalyst precursor particles. Each catalyst precursor particle comprises at least one particle of the platinum (Pt) compound disposed or supported on a particle of the support material. Typically, each catalyst precursor particle comprises, or can consist essentially of, a plurality of particles of the Pt compound disposed or supported on a particle of the support material.

It is preferred that the first composition (i.e. prepared in step (i)) is in solid form, preferably in a solid, powder form.

Step (i) is preferably a step of (i) preparing a first composition in solid form by (a) preparing a solution or dispersion of the first composition using an incipient wetness impregnation method and then (b) removing liquid from the solution or dispersion of the first composition (e.g. by freeze drying and/or heating, preferably heating) to produce a first composition in solid form. In contrast to other methods, such as deposition-precipitation or co-precipitation, the use of an incipient wetness impregnation method to prepare the first composition is advantageous because it minimises or avoids the formation of large Pt (and other PGM) crystallites that would adversely affect the oxidative activity of the catalyst composition.

Step (i)(a) of preparing a solution or dispersion of the first composition using an incipient wetness impregnation method typically comprises contacting the support material with a liquid (preferably an aqueous liquid) comprising a Pt compound, preferably to produce a support material impregnated with the liquid.

The Pt compound may be a platinum (Pt) salt and/or an oxide of platinum (Pt). The Pt salt may, for example, be a nitrate of platinum [e.g. platinum (IV) nitrate, tetraammineplatinum (II) nitrate]; a halide of platinum [e.g. tetraammineplatinum (II) tetrachloroplatinate (II)]; a hydroxide of platinum [e.g. tetraammineplatinum (II) hydroxide, platinum tetra monoethanolamine hydroxide]; a carbonate of platinum [e.g. tetraammineplatinum carbonate]; or an organic acid salt of platinum [e.g. platinum (II) acetate].

When the first composition comprises a Pd compound and/or palladium in an elemental form (e.g. palladium (Pd) metal), then the liquid may further comprise a Pd compound.

The Pd compound may be a palladium (Pd) salt and/or an oxide of palladium (Pd). The Pd salt may, for example, be a nitrate of palladium [e.g. palladium (II) nitrate, tetraamminepalladium (II) nitrate]; a halide of palladium; a hydroxide of palladium; or an organic acid salt of palladium.

When the first composition comprises a catalyst promoter, then the liquid may further comprise a catalyst promoter or a precursor therefor.

The catalyst promoter or precursor therefor is preferably an alkaline earth metal compound (e.g. a binary alkaline earth metal compound). The alkaline earth metal compound is typically an oxide of the alkaline earth metal or a salt of an alkaline earth metal, such as a nitrate of an alkaline earth metal, a hydroxide of an alkaline earth metal, a carbonate of an alkaline earth metal or a halide of an alkaline earth metal.

The alkaline earth metal compound may comprise an alkaline earth metal selected from the group consisting of magnesium (Mg), calcium (Ca), barium (Ba), strontium (Sr) and a combination of two or more thereof. It is preferred that the alkaline earth metal is barium.

When the first composition comprises a catalyst promoter, it is preferred that the liquid comprises a catalyst promoter precursor, which is a salt of an alkaline earth metal.

It is preferred that step (i) of the method of the invention comprises:

(i) preparing a first composition in solid form by:
  (a) preparing a solution or dispersion of the first composition using an incipient wetness impregnation method comprising contacting the support material with a liquid to produce a support material impregnated with the liquid, wherein the liquid comprises a Pt compound; and then
  (b) removing liquid from the solution or dispersion of the first composition to produce a first composition in solid form.

Generally, during the preparation of the first composition it is possible that some of the Pt compound (albeit a small amount) may be converted into metallic platinum. However, most of the platinum in the first composition will be in the form of the Pt compound.

The first composition may further comprise platinum in an elemental form (e.g. platinum (Pt) metal) disposed or supported on the support material. The first composition may comprise, or consist essentially of, a platinum (Pt) compound disposed or supported on a support material and optionally platinum in an elemental form (e.g. platinum metal) disposed on the support material. When the first composition comprises platinum in an elemental form, then typically the first composition comprises a molar amount of platinum from the platinum (Pt) compound that is greater (typically at least 50% greater) than the molar amount of platinum in elemental form.

Each catalyst precursor particle may comprise, or consist essentially of, at least one particle of the platinum (Pt)

compound and at least one particle of the platinum in elemental form disposed or supported on a particle of the support material.

It may be preferable that the first composition consists essentially of a platinum (Pt) compound disposed on a support material (e.g. the first composition consists essentially of a plurality of catalyst precursor particles, wherein each catalyst precursor particle consists essentially of at least one particle, preferably a plurality of particles, of the Pt compound disposed or supported on the support material).

The first composition may comprise a Pt compound, and optionally Pt in an elemental form (e.g. metallic Pt), as the only platinum group metal (PGM) or compound thereof. Thus, with the exception of Pt, no other PGMs may be present in the first composition.

Alternatively, the first composition may further comprise a palladium (Pd) compound and/or palladium in an elemental form (e.g. palladium (Pd) metal). In general, when the first composition contains palladium, it is preferred that the first composition comprises a palladium (Pd) compound.

Typically, the Pd compound and/or the palladium in elemental form (e.g. metallic Pd) may be disposed or supported on a support material.

The Pd compound and/or the metallic Pd may be disposed or supported on the support material (i.e. a support material having the same composition as the support material used for the Pt compound).

It is preferred that the Pd compound and/or the metallic Pd is disposed or supported on the same support material as the support material for the Pt compound. Thus, the first composition may comprise, or consist essentially of, (i) a Pt compound disposed on a support material, and (ii) a Pd compound and/or metallic Pd disposed on the support material.

The first composition typically comprises a plurality of catalyst precursor particles, wherein each catalyst precursor particle comprises, or consists essentially of, (i) at least one particle of the platinum (Pt) compound disposed or supported on a particle of the support material and (ii) at least one particle of the Pd compound and/or at least one particle of metallic Pd disposed or supported on a particle of the support material. The catalyst precursor particle may comprise, or consist essentially of, (i) at least one particle of the Pt compound and (ii) at least one particle of the Pd compound and/or at least one particle of metallic Pd, wherein the at least one particle of the Pt compound and the at least one particle of the Pd compound and/or the at least particle of metallic Pd are disposed or supported on a particle of the support material (i.e. the particle of the Pt compound and the particle of the Pd compound and/or the particle of the metallic Pd are disposed or supported on the same particle of the support material).

The first composition typically comprises a total amount of Pt (e.g. in the form of the Pt compound and/or Pt in an elemental form) and a total amount of Pd (e.g. in the form of the Pd compound and/or in Pd in an elemental form) to provide a catalyst composition having a desired ratio by moles of platinum to palladium or a desired ratio by mass of platinum to palladium (see below).

The first composition may further comprise a catalyst promoter or a precursor therefor, such as described above.

Typically, the catalyst promoter or a precursor therefor may be disposed or supported on a support material. It is preferred that the catalyst promoter or precursor therefor is disposed or supported on the same support material as the support material for the Pt compound. Thus, the first composition may comprise, or consist essentially of, (i) a Pt compound disposed on a support material, (ii) a catalyst promoter or a precursor therefor disposed on the support material and optionally (iii) a Pd compound and/or metallic Pd disposed on the support material.

The first composition typically comprises a plurality of catalyst precursor particles, wherein each catalyst precursor particle comprises, or consists essentially of, (i) at least one particle of the Pt compound, (ii) at least one particle of the catalyst promoter or a precursor therefor, and optionally (iii) at least one particle of the Pd compound and/or at least one particle of metallic Pd, wherein the at least one particle of the Pt compound and the at least one particle of the catalyst promoter or the precursor therefor are disposed or supported on a particle of the support material (i.e. the particle of the Pt compound and the particle of the catalyst promoter or precursor therefor are disposed or supported on the same particle of the support material). The at least one particle of the Pt compound, the at least one particle of the catalyst promoter or the precursor therefor, and the at least one particle of the Pd compound and/or at least one particle of metallic Pd are disposed or supported on a particle of the support material.

Step (ii) of the method is a step of (ii) preparing a second composition (e.g. from the first composition) by reducing the Pt compound to platinum with a reducing agent. Typically step (ii) is performed directly after step (i) (e.g. there are no other, intervening method steps).

Typically, step (ii) comprises (ii) preparing a second composition by contacting the first composition with a reducing agent to reduce the Pt compound to platinum (i.e. platinum in an elemental form [e.g. metallic Pt]). It is preferred to reduce substantially all of the Pt compound to platinum by contacting the first composition with the reducing agent.

It has been found that by reducing the Pt compound to platinum metal prior to heating (i.e. in step (iii) of the method) a catalyst composition having both high NO oxidation activity and stable NO oxidation activity can be obtained. In particular, the reduction step allows the preparation of a catalyst composition that shows a higher NO oxidation activity than a catalyst composition that has been prepared in a similar manner without a reduction step prior to heating or calcining the composition. The catalyst composition of the invention may also show similar or improved NO oxidation stability compared to a catalyst composition that has been prepared without the reduction step prior to heating or calcining the composition.

Without wishing to be bound by theory, it is believed that the reduction step results in the formation of a composition (i.e. the second composition) where small particles of Pt metal are highly dispersed over the surface of the support material prior to the heating step. It is thought that the heating step causes sintering of Pt metal particles that are in close proximity to one another so that no further sintering is possible at the temperature at which heating takes place or lower temperatures. Thus, any sinterable particles of Pt metal that are present when the second composition is first formed are sintered during the heating step to reduce or prevent further sintering up to the heating temperature. However, due to the highly dispersed nature of the particles of Pt metal over the surface of the support material, the proportion of Pt particles that undergo sintering is minimal and the resulting catalyst composition retains high NO oxidation activity because of the large surface area provided by the small particles of Pt metal.

In contrast, when a Pt compound is converted by heating/calcining (i.e. the Pt compound is not chemically reduced prior to heating/calcining), the particles of the Pt that are formed tend to be larger and are not as highly dispersed over the surface of the support material compared to when they are prepared by the method of the invention.

The reducing agent may be an organic acid (e.g. ascorbic acid), an aldehyde, an alcohol, a polyol, a hydride reducing agent (e.g. $NaBH_4$ or $LiAlH_4$), hydrazine, gaseous hydrogen or an acid selected from the group consisting of $H_3PO_2$, $Na_2H_2PO_2$ and $H_2SO_4$ or a salt thereof. It is preferred that the reducing agent is hydrazine.

Generally, step (ii) comprises (ii) preparing a second composition by contacting a solution or a dispersion of the first composition with a reducing agent to reduce the Pt compound to platinum (i.e. platinum in an elemental form [e.g. metallic Pt]).

In step (ii), the step of contacting the first composition is typically by adding a solution of the reducing agent to the first composition to reduce the Pt compound to platinum (i.e. platinum in an elemental form [e.g. metallic Pt]). It is preferred that step (ii) comprises adding a solution of the reducing agent to a solution or a dispersion of the first composition to reduce the Pt compound to platinum.

When step (i) of the method comprises preparing a first composition in solid form, then step (ii) may comprise:
(a) forming a solution or a dispersion of the first composition, and then
(b) preparing a second composition by contacting a solution or a dispersion of the first composition with a reducing agent to reduce the Pt compound to platinum, such as described above.

When a solution or a dispersion of the composition and/or a solution of the reducing agent is used, then step (ii) may further comprise the steps of:
filtering a dispersion of the second composition to obtain the second composition in solid form;
optionally washing the second composition in solid form; and
drying the second composition.

The drying of the second composition may be by freeze drying and/or heating. It is preferred that the drying of the second composition is by heating the second composition to a temperature of 200° C. or less, preferably 150° C. or less.

After reducing the Pt compound to platinum, most of the platinum that is present in the second composition will be Pt in an elemental form (e.g. metallic Pt).

The second composition comprises platinum in an elemental form (e.g. platinum (Pt) metal) disposed or supported on the support material. The second composition may comprise, or consist essentially of, platinum in an elemental form (e.g. platinum metal) disposed or supported on a support material. There may be a minor amount of Pt compound present in the second composition. When the second composition comprises the platinum (Pt) compound, then typically the second composition comprises a molar amount of platinum in an elemental form that is greater (typically at least 100% greater) than the molar amount of platinum from the platinum (Pt) compound.

The second composition comprises a plurality of unconditioned catalyst particles. Each unconditioned catalyst particle may comprise, or consist essentially of, at least one particle, preferably a plurality of particles, of platinum in elemental form disposed or supported on a particle of the support material.

When the first composition comprises platinum (as a Pt compound and/or Pt in an elemental form), as the only platinum group metal (PGM), then the second composition comprises platinum as the only PGM. Thus, with the exception of Pt, no other PGMs may be present in the second composition.

Alternatively, when the first composition comprises palladium (Pd) (as a Pd compound and/or Pd in an elemental form), then the second composition comprises a palladium (Pd) compound and/or palladium in an elemental form. The Pd compound and/or the palladium in elemental form (e.g. metallic Pd) may be disposed or supported on the support material (i.e. a support material having the same composition as the support material used for the Pt compound).

When the first composition comprises a Pd compound, the step of reducing the Pt compound to platinum with a reducing agent may or may not reduce the Pd compound to palladium in an elemental form. Some reducing agents can selectively reduce the Pt compound to platinum in an elemental form without reducing any Pd compound that may be present. It is preferable that the step of reducing the Pt compound to platinum with a reducing agent is a step of reducing the Pt compound to platinum and reducing the Pd compound to palladium with a reducing agent. Thus, the second composition may comprise, or consist essentially of, (i) Pt in an elemental form disposed or supported on a support material, and (ii) metallic Pd disposed or supported on the support material.

The second composition typically comprises a plurality of unconditioned catalyst particles, wherein each unconditioned catalyst precursor particle comprises, or consists essentially of, (i) at least one particle of platinum in an elemental form disposed or supported on a particle of the support material and (ii) at least one particle of the Pd compound and/or at least one particle of palladium in an elemental form disposed or supported on a particle of the support material.

The second composition may further comprise a catalyst promoter or a precursor therefor, such as described above. The second composition may comprise, or consist essentially of, (i) platinum in an elemental form disposed on a support material, (ii) a catalyst promoter or a precursor therefor disposed on the support material and optionally (iii) a Pd compound and/or metallic Pd disposed on the support material.

Each unconditioned catalyst particle may comprise, or consists essentially of, (i) at least one particle of platinum in an elemental form, (ii) at least one particle of the catalyst promoter or a precursor therefor, and optionally (iii) at least one particle of the Pd compound and/or at least one particle of palladium in an elemental form, wherein the at least one particle of platinum in an elemental form, the at least one particle of the catalyst promoter or the precursor therefor are disposed or supported on a particle of the support material. The at least one particle of platinum in an elemental form, the at least one particle of the catalyst promoter or the precursor therefor, and the at least one particle of the Pd compound and/or at least one particle of metallic Pd are preferably disposed or supported on a particle (i.e. the same particle) of the support material.

Step (iii) of the method of the invention is a step of heating the second composition to at least 650° C. (e.g. to produce a catalyst composition). It has been found that this heating step can stabilise the NO oxidation activity of the resulting catalyst composition. Thus, step (iii) is a step of heating the second composition to stabilise the NO oxidation activity thereof.

In conventional methods of manufacturing oxidation catalysts, the coated catalyst substrate is typically calcined at temperatures up to 500° C. In general, the second composition in step (ii) is heated to a temperature that is higher than the temperatures that are conventionally used for the manufacture of an oxidation catalyst.

Step (iii) is a step of heating the second composition to at least 650° C. (e.g. 650 to 1000° C.), preferably to at least 700° C. (e.g. 700 to 1000° C.), such as to at least 750° C. (e.g. 750 to 900° C.), more preferably to at least 800° C., such as to at least 850° C.

Typically, step (iii) comprises heating the second composition in air or under an inert gas atmosphere, preferably in air.

Step (iii) may, for example, comprise heating the second composition in an atmosphere containing 1 to 10% by volume of water and 90 to 99% by volume of air. A catalyst composition that has been hydrothermally treated may have advantageous NO oxidation activity, especially when the catalyst composition comprises platinum and palladium.

Alternatively, step (iii) may comprise heating the second composition in an atmosphere (e.g. inert gas atmosphere) free of water.

In general, step (iii) comprises heating the second composition for at least 30 minutes (e.g. at least 1 hour), preferably at least 2 hours, such as at least 3 hours, more preferably at least 5 hours, to at least 650° C. (e.g. 650 to 1000° C.) or to at least 700° C. (e.g. 700 to 1000° C.) or to at least 750° C. (e.g. 750 to 900° C.), such as to at least 800° C. or to at least 850° C. The heating time used in the method of the invention is generally longer than the time taken to calcine coated catalyst substrates in conventional methods of manufacturing oxidation catalysts.

Step (iii) may comprise heating the second composition at a ramp rate of greater than 2° C. per minute to at least 650° C. (e.g. 650 to 1000° C.), more preferably to at least 700° C. (e.g. 700 to 1000° C.), such as to at least 750° C. (e.g. 750 to 1000° C.), particularly to at least 800° C., such as to at least 850° C.

The invention also provides a catalyst composition, which may be obtainable from the method described above.

The catalyst composition of the invention comprises platinum (Pt) disposed or supported on a support material. The platinum is platinum in an elemental form (e.g. metallic Pt).

The platinum (Pt) typically has a mean crystallite size of 10 to 35 nm, such as 10 to 30 nm or 15 to 25 nm. The mean crystallite size is preferably 11 to 20 nm, particularly 12 to 18 nm.

The term "mean crystallite size" in this context refers to the average (i.e. mean) coherent domain size of platinum particles on the support material. The platinum is generally present as crystallites on the support material. Pt crystallite size can be routinely determined by using X-ray diffraction (XRD) technique (e.g. at 25° C.) and by applying established methods relating to the broadness of the diffraction peaks to determine the crystallite size. Typically, the volume averaged column height calculated from the integral breadth is used to determine the mean crystallite size.

It has been found that the catalyst composition of the invention shows stable activity toward oxidising NO to $NO_2$ in an exhaust gas compared to a "fresh" catalyst composition prepared using conventional washcoat methods. The mean crystallite size of platinum in a fresh catalyst composition prepared in situ by conventional washcoat methods is typically less than 10 nm, and usually around 2 to 3 nm. In contrast, the catalyst composition of the invention has a larger mean crystallite size of platinum compared to the mean crystallite size of platinum that is typically found in fresh catalyst compositions prepared by conventional methods.

It is intended that the primary function of the catalyst composition of the invention is for oxidising NO to $NO_2$. However, it is appreciated that the catalyst composition may catalyse other reactions when it is in contact with an exhaust gas, depending on temperature, such as oxidation of carbon monoxide (CO) and/or hydrocarbons (HCs).

The catalyst composition has a minimum temperature at which it becomes effective at catalysing the oxidation of NO to $NO_2$. It is, for example, conventional in the art to quote a "light-off" temperature for a specific catalytic reaction. A "light-off" temperature is a temperature at which the oxidation catalyst starts to perform a particular catalytic reaction (e.g. oxidation of NO to $NO_2$) or performs that reaction to a certain level.

During use, the amount of $NO_2$ in the exhaust gas from the outlet of the oxidation catalyst of the invention is typically greater than the amount of $NO_2$ in the exhaust gas that passes into an oxidation catalyst comprising the catalyst composition of the invention. In general, the oxidation catalyst or catalyst composition oxidises >10% of NO to $NO_2$ at about 300° C.

The catalyst composition comprises a support material that is thermally stable in use (e.g. under the conditions to which the oxidation catalyst is subjected during normal use). The term "thermally stable" in this context refers to a support material comprising, or consisting essentially of, a refractory metal oxide that has a substantially constant specific surface area and/or a substantially constant pore volume. The term "substantially constant" in this context refers to a specific surface area or a pore volume that deviates from its mean value by less than 10%, preferably by less than 5%.

It may be preferable for the support material (e.g. the platinum support material and/or the palladium support material) to comprise, or consist essentially of, a refractory metal oxide that is chemically unreactive (i.e. in use) toward contaminant metals in the exhaust gas. Such contaminant metals are well known in the art and may be present in the fuel or oil used in the compression ignition.

Typically, the support material comprises, or consists essentially of, a refractory metal oxide. The refractory metal oxide is typically selected from the group consisting of alumina, silica, ceria, titania, zirconia, and a mixed or composite oxide of two or more thereof. For example, the refractory metal oxide may be selected from the group consisting of alumina, silica, titania, zirconia, ceria, silica-alumina, titania-alumina, zirconia-alumina, ceria-alumina, titania-silica, zirconia-silica, zirconia-titania and ceria-zirconia. It is preferred that the refractory metal oxide is selected from alumina, silica and mixed or composite oxides thereof. More preferably, the refractory metal oxide is selected from alumina, silica-alumina and a mixture of alumina and ceria. Even more preferably, the refractory metal oxide is selected from alumina and silica-alumina.

In general, it is preferred that the refractory metal oxide comprises, or consists essentially of, alumina. The alumina can be $\alpha$-$Al_2O_3$, $\beta$-$Al_2O_3$, or $\gamma$-$Al_2O_3$. It is preferred that the alumina comprises, or consists essentially of, $\gamma$-$Al_2O_3$.

The refractory metal oxide may comprise, or consist essentially of, a mixed or composite oxide of alumina (e.g. silica-alumina or a mixture of alumina and ceria). Preferably the mixed or composite oxide of alumina comprises at least 50 to 99% by weight of alumina, more preferably 70 to 95% by weight of alumina, even more preferably 75 to 90% by weight of alumina.

In general, the support material, or the refractory metal oxide thereof, may optionally be doped (e.g. with a dopant). The dopant may be selected from the group consisting of zirconium (Zr), titanium (Ti), silicon (Si), yttrium (Y), lanthanum (La), praseodymium (Pr), samarium (Sm), neodymium (Nd) and an oxide thereof. The inclusion of a dopant can thermally stabilise the support material. It is to be understood that any reference to "doped" in this context refers to a material where the bulk or host lattice of the refractory metal oxide is substitution doped or interstitially doped with a dopant.

When the support material or the refractory metal oxide thereof is doped, then generally the amount of dopant is 0.25 to 2.5% by weight, preferably 0.5 to 1.5% by weight (e.g. about 1% by weight). Each amount in this context refers to the total amount per support material or refractory metal oxide.

The support material may comprise, or consist essentially of, alumina doped with a dopant. The alumina may be doped with a dopant comprising silicon (Si), magnesium (Mg), barium (Ba), lanthanum (La), cerium (Ce), titanium (Ti), or zirconium (Zr) or a combination of two or more thereof. The dopant may comprises, or consist essentially of, an oxide of silicon, an oxide of magnesium, an oxide of barium, an oxide of lanthanum, an oxide of cerium, an oxide of titanium or an oxide of zirconium. Preferably, the dopant comprises, or consists essentially of, silicon, magnesium, barium, or cerium, or an oxide thereof, particularly silicon, or cerium, or an oxide thereof. More preferably, the dopant comprises, or consists essentially of, silicon, magnesium, or barium, or an oxide thereof; particularly silicon, or magnesium, or an oxide thereof; especially silicon or an oxide thereof.

When the alumina is alumina doped with silica, then the alumina is doped with silica in a total amount of 0.5 to 45% by weight (i.e. % by weight of the alumina), preferably 1 to 40% by weight, more preferably 1.5 to 30% by weight (e.g. 1.5 to 10% by weight), particularly 2.5 to 25% by weight, more particularly 3.5 to 20% by weight (e.g. 5 to 20% by weight), even more preferably 4.5 to 15% by weight. When the alumina is alumina doped with magnesium oxide, then the alumina is doped with magnesium in an amount as defined above or an amount of 1 to 30% by weight (i.e. % by weight of the alumina), preferably 5 to 25% by weight.

When the refractory metal oxide is ceria-alumina or ceria-zirconia, then the ceria-zirconia or the ceria-alumina may consist essentially of 20 to 95% by weight of ceria and 5 to 80% by weight of alumina or zirconia (e.g. 50 to 95% by weight ceria and 5 to 50% by weight alumina or zirconia), preferably 35 to 80% by weight of ceria and 20 to 65% by weight alumina or zirconia (e.g. 55 to 80% by weight ceria and 20 to 45% by weight alumina or zirconia), even more preferably 45 to 75% by weight of ceria and 25 to 55% by weight alumina or zirconia.

In general, the catalyst composition of the invention comprises platinum (Pt) disposed or supported on the support material. The platinum (Pt) may be disposed directly onto or is directly supported by the support material (e.g. there is no intervening support material between platinum and the support material). For example, platinum can be dispersed on the support material and/or impregnated into the support material.

The catalyst composition typically comprises ≥0.5% by weight of platinum, preferably ≥1.0% by weight of platinum.

Typically, the catalyst composition comprises a plurality of catalyst particles, wherein each particle comprises, or consists essentially of, at least one particle, preferably a plurality of particles, of platinum disposed or supported on a particle of the support material.

The catalyst composition may further comprise palladium, such as a palladium compound and/or palladium in an elemental form (e.g. metallic Pd). When the catalyst composition comprises palladium, it is preferred that the palladium is palladium in an elemental form.

If the catalyst composition comprises palladium, it is preferred that the catalyst composition has a ratio by moles of platinum (Pt) to palladium (Pd) of >1:1. The activity of platinum toward oxidising NO to $NO_2$ is significantly better than that of palladium.

Typically, the catalyst composition has a ratio by mass of platinum (Pt) to palladium (Pd) of ≥4:1. Thus, the ratio by mass of Pt to Pd may be 25:1 to 4:1, such as 20:1 to 4.5:1, preferably 15:1 to 5:1 (e.g. 12.5:1 to 6:1), more preferably 10:1 to 7:1.

The palladium may be disposed or supported on the support material (i.e. the support material used for platinum and palladium is the same (e.g. the same composition)). The palladium (Pd) may be disposed directly onto or is directly supported by the support material (e.g. there is no intervening support material between palladium and the support material). For example, palladium can be dispersed on the support material and/or impregnated into the support material.

It may be preferable for the catalyst composition to comprise platinum (Pt) as the only platinum group metal (PGM). For example, when the catalyst composition comprises platinum and palladium disposed or supported on a support material (i.e. particles of platinum and palladium are present on the same support material), then a platinum-palladium alloy may be formed. This can be disadvantageous for the oxidation of NO to $NO_2$.

In general, it may be preferable that the catalyst composition of the invention does not comprise Pd and/or Rh (i.e. metallic Pd or Rh or a compound thereof). The oxidation catalyst of the invention may not comprise Pd and/or Rh.

It has surprisingly been found that the $NO_2$ generating capability can be further stabilised by mixing an inert material, such as a "second" refractory metal oxide, with the supported platinum particles. Thus, a catalyst composition having a small $\Delta NO_{2\ (from\ fresh)}$ can be obtained. In fact, inclusion of an inert material may result in a catalyst composition having a $\Delta NO_{2(from\ fresh)}$ that is lower than that for a catalyst composition without the inert material.

The catalyst composition may further comprise a second refractory metal oxide. The second refractory metal oxide is generally different (i.e. a different material) to a refractory metal oxide (e.g. the "first" refractory metal oxide) of the support material, such as the refractory metal oxide on which the platinum is disposed or supported.

It is generally preferred that the second refractory metal oxide is not a support material for a platinum group metal, such as platinum, palladium and/or rhodium. Thus, it is further preferred that nothing is disposed or supported on the second refractory metal oxide.

The second refractory metal oxide may be a refractory metal oxide as defined above for the support material. For example, the refractory metal oxide is typically selected from the group consisting of alumina, silica, ceria, titania, zirconia, and a mixed or composite oxide of two or more thereof (e.g. alumina, silica, titania, zirconia, ceria, silica-alumina, titania-alumina, zirconia-alumina, ceria-alumina, titania-silica, zirconia-silica, zirconia-titania or ceria-zirconia). It is preferred that the second refractory metal oxide is selected from alumina, silica, a mixed or composite oxide of alumina and silica, and alumina doped with silica. More preferably, the second refractory metal oxide is alumina doped with silica.

When the second refractory metal oxide is alumina doped with silica, then the alumina is doped with silica in a total amount of 0.5 to 45% by weight (i.e. % by weight of the alumina), preferably 1 to 40% by weight, more preferably 1.5 to 30% by weight (e.g. 1.5 to 10% by weight), particularly 2.5 to 25% by weight, more particularly 3.5 to 20% by weight (e.g. 5 to 20% by weight), even more preferably 4.5 to 15% by weight. When the alumina is alumina doped with magnesium oxide, then the alumina is doped with magnesium in an amount as defined above or an amount of 1 to 30% by weight (i.e. by weight of the alumina), preferably 5 to 25% by weight.

The catalyst composition typically comprises a mixture of the second refractory metal oxide and the platinum disposed on a support material.

When the catalyst composition comprises a second refractory metal oxide, then it may be preferable that the catalyst composition comprises ≥40% by weight of the second refractory metal oxide, more preferably ≥40% by weight of the second refractory metal oxide.

When the catalyst composition comprises a second refractory metal oxide, then it may be preferable that the catalyst composition comprises ≥0.2% by weight of platinum, more preferably ≥0.4% by weight of platinum.

In the method of preparing the catalyst of the invention, the second refractory metal oxide may be admixed into the first composition, admixed into the second composition or admixed into the composition after it has been heated to at least 650° C.

Step (i) of the method may comprise preparing a first composition comprising a platinum (Pt) compound disposed or supported on a support material, wherein the support material comprises a first refractory metal oxide, and then admixing a second refractory metal oxide into the first composition.

Step (ii) of the method may comprise preparing a second composition by reducing the platinum (Pt) compound to platinum (Pt) with a reducing agent, and then admixing a second refractory metal oxide into the second composition.

Alternatively, the method of the invention may comprise the steps:
(iii) heating the second composition to at least 650° C. to produce a third composition; and
(iv) admixing a second refractory oxide into the third composition (i.e. to prepare the catalyst composition).

The catalyst composition may further comprise a hydrocarbon adsorbent. The hydrocarbon adsorbent is preferably a zeolite.

When the hydrocarbon adsorbent is a zeolite, then preferably the zeolite is a medium pore zeolite (e.g. a zeolite having a maximum ring size of eight tetrahedral atoms) or a large pore zeolite (e.g. a zeolite having a maximum ring size of ten tetrahedral atoms).

Examples of suitable zeolites or types of zeolite include faujasite, clinoptilolite, mordenite, silicalite, ferrierite, zeolite X, zeolite Y, ultrastable zeolite Y, AEI zeolite, ZSM-5 zeolite, ZSM-12 zeolite, ZSM-20 zeolite, ZSM-34 zeolite, CHA zeolite, SSZ-3 zeolite, SAPO-5 zeolite, offretite, a beta zeolite or a copper CHA zeolite. The zeolite is preferably ZSM-5, a beta zeolite or a Y zeolite.

In general, it is preferred that the catalyst composition does not comprise a hydrocarbon adsorbent, such as a zeolite.

The catalyst composition may further comprise a catalyst promoter. The catalyst promoter preferably comprises an alkaline earth metal.

The catalyst promoter may be an alkaline earth metal compound, such as an oxide of the alkaline earth metal, a hydroxide of the alkaline earth metal or a carbonate of the alkaline earth metal. When the catalyst promoter is an alkaline earth metal compound, then preferably the alkaline earth metal compound consists of an alkaline earth metal cation and an anion (e.g. $CO_3^{2-}$, $OH^-$) or the alkaline earth metal compound is a binary alkaline earth metal compound, such as a binary alkaline earth metal oxide.

The alkaline earth metal may be magnesium (Mg), calcium (Ca), barium (Ba), strontium (Sr) or combinations of two or more thereof. It is preferred that the alkaline earth metal is barium.

Typically, the catalyst composition further comprises a catalyst promoter when the catalyst composition comprises platinum (Pt) as the only platinum group metal (PGM).

It may be preferable that the catalyst composition typically does not comprise an alkali metal, an alkaline earth metal and/or rhodium.

The catalyst composition is typically a solid, particularly a powder. In general, the catalyst composition (i.e. the catalyst composition per se) is not disposed or supported on a substrate.

The catalyst composition of the invention is typically an unused catalyst composition (i.e. the catalyst composition is "fresh").

The invention also provides an oxidation catalyst for treating an exhaust gas from a compression ignition engine. The oxidation catalyst comprises the catalyst composition of the invention.

The oxidation catalyst of the invention generally comprises the catalyst composition and a substrate. The catalyst composition may be disposed or supported on the substrate.

The catalyst composition may be directly disposed or supported on the substrate (e.g. the catalyst composition is in contact with a surface of the substrate).

In general, the oxidation catalyst of the invention comprises, or consists of, a first washcoat region, a second washcoat region and a substrate, wherein the first washcoat region comprises, or consists essentially of, the catalyst composition and the second washcoat region comprises, or consists essentially of, a second platinum group metal (PGM) and a second support material. The first washcoat region and the second washcoat region are disposed on the substrate. The first washcoat region has a different composition to the second washcoat region.

Typically, the first washcoat region or the catalyst composition comprises an amount of platinum (Pt) of 0.2 to 15% by weight, preferably 0.5 to 10% by weight, more preferably 1 to 9% by weight (e.g. 1.2 to 8.5%, such as 1.5 to 8% by weight), such as 1.5 to 7% by weight (e.g. 2 to 7%, such as 4 to 6% by weight). The % by weight in this context is with reference to the amount of the support material.

The first washcoat region typically comprises platinum (Pt) in an amount of 5 to 300 g ft$^{-3}$, more preferably 10 to 250 g ft$^{-3}$, such as 20 to 200 g ft$^{-3}$, still more preferably 25 to 175 g ft$^{-3}$, and even more preferably 35 to 150 g ft$^{-3}$ (e.g. 50 to 125 g ft$^{-3}$). For example, the first washcoat region may comprise a total amount of platinum (Pt) of 5 to 150 g ft$^{-3}$, more preferably 7.5 to 125 g ft$^{-3}$, such as 10 to 110 g ft$^{-3}$, still more preferably 25 to 100 g ft$^{-3}$, and even more preferably 30 to 75 g ft$^{-3}$ (e.g. 40 to 125 g ft$^{-3}$).

When the catalyst composition comprises palladium, the first washcoat region or catalyst composition may comprise an amount of palladium (Pd) of 0.2 to 10% by weight (e.g. 0.4 to 3.5% by weight), preferably 0.5 to 7.5% by weight (e.g. 0.75 to 2.5% by weight or 1 to 1.75% by weight), more preferably 1 to 5% by weight. The % by weight in this context is with reference to the amount of the support material.

The first washcoat region typically comprises palladium (Pd) in an amount of 1 to 175 g ft$^{-3}$. For example, the first washcoat region may comprise palladium (Pd) in an amount of 5 to 125 g ft$^{-3}$, preferably 10 to 100 g ft$^{-3}$, such as 15 to 85 g ft$^{-3}$ (e.g. 25 to 85 g ft$^{-3}$), still more preferably 25 to 80 g ft$^{-3}$ (e.g. 35 to 80 g ft$^{-3}$), and even more preferably 30 to 75 g ft$^{-3}$ (e.g. 50 to 75 g ft$^{-3}$).

Typically, the first washcoat region comprises an amount of the support material (e.g. the total amount of support material) of 0.1 to 4.5 g (e.g. 0.25 to 4.2 g in$^{-3}$), preferably 0.3 to 3.8 g in$^{-3}$, still more preferably 0.5 to 3.0 g (1 to 2.75 g in$^{-3}$ or 0.75 to 1.5 g in$^{-3}$), and even more preferably 0.6 to 2.5 g (e.g. 0.75 to 2.3 g in$^3$).

The primary function of the second washcoat region is to oxidise carbon monoxide (CO) and/or hydrocarbons (HCs). It is appreciated that some oxidation of NO to $NO_2$ may also occur, but this will be to a lesser extent than that catalysed by the catalyst composition.

The second platinum group metal (PGM) is typically selected from the group consisting of platinum, palladium and a combination of platinum and palladium. When the second PGM is palladium, then the second washcoat region may further comprise gold. The atomic ratio of Pd:Au is typically 9:1 to 1:9, preferably 5:1 to 1:5, such as 2:1 to 1:2.

When the second washcoat region comprises palladium and gold, it is preferred that the second washcoat region comprises a palladium-gold alloy, preferably a bimetallic palladium-gold alloy.

When the second washcoat region comprises platinum (i.e. the second PGM is platinum or a combination of platinum and palladium), the platinum may be disposed or supported on the second support material. Platinum may be dispersed on the second support material and/or impregnated into the second support material.

The platinum may be disposed directly onto or is directly supported by the second support material. Thus, for example, there is no intervening support material between the platinum and the second support material. It is preferred that the platinum is in direct contact with the second support material.

When the second washcoat region comprises palladium (i.e. the second PGM is palladium or a combination of platinum and palladium), the palladium may be disposed or supported on the second support material. Palladium may be dispersed on the second support material and/or impregnated into the second support material.

The palladium may be disposed directly onto or is directly supported by the second support material. Thus, for example, there is no intervening support material between the palladium and the second support material. It is preferred that the palladium is in direct contact with the second support material.

In the second washcoat region, the platinum and the palladium can be disposed or supported on the same second support material. Thus, the second washcoat region may comprise a single support material, which is the second support material.

The second washcoat region may comprise a platinum-palladium alloy (i.e. the combination of platinum and palladium comprises, or consists essentially of, a platinum-palladium alloy), preferably a bimetallic platinum-palladium alloy. It is preferred that the second washcoat region comprises a platinum-palladium alloy when the platinum and palladium are disposed or supported on the same second support material.

Alternatively, platinum can be disposed or supported on a platinum support material and palladium can be disposed or supported on a palladium support material, wherein the platinum support material and the palladium support material are different (e.g. the second support material comprises the platinum support material and the palladium support material). Thus, the platinum support material and the palladium support material can have different compositions. More preferably, the platinum support material and the palladium support material comprise, or consist essentially of, different refractory metal oxides.

Typically, the or each second support material (e.g. the platinum support material and/or the palladium support material) comprises, or consists essentially of, a refractory metal oxide. The or each refractory metal oxide is typically selected from the group consisting of alumina, silica, ceria, titania, zirconia, and a mixed or composite oxide of two or more thereof. For example, the refractory metal oxide may be selected from the group consisting of alumina, silica, titania, zirconia, ceria, silica-alumina, titania-alumina, zirconia-alumina, ceria-alumina, titania-silica, zirconia-silica, zirconia-titania and ceria-zirconia. It is preferred that the refractory metal oxide is selected from alumina, silica, ceria, zirconia and mixed or composite oxides thereof. More preferably, the refractory metal oxide is selected from alumina, silica-alumina, ceria, ceria-zirconia and a mixture of alumina and ceria. Even more preferably, the refractory metal oxide is selected from alumina and silica-alumina.

The alumina can be $\alpha$-$Al_2O_3$, $\beta$-$Al_2O_3$, or $\gamma$-$Al_2O_3$. It is preferred that the alumina comprises, or consists essentially of, $\gamma$-$Al_2O_3$.

When the refractory metal oxide comprises, or consists essentially of, a mixed or composite oxide of alumina (e.g. silica-alumina or a mixture of alumina and ceria), then preferably the mixed or composite oxide of alumina comprises at least 50 to 99% by weight of alumina, more preferably 70 to 95% by weight of alumina, even more preferably 75 to 90% by weight of alumina.

In general, the or each second support material (e.g. the platinum support material and/or the palladium support material), or the refractory metal oxide thereof, may optionally be doped (e.g. with a dopant). The dopant may be selected from the group consisting of zirconium (Zr), titanium (Ti), silicon (Si), yttrium (Y), lanthanum (La), praseodymium (Pr), samarium (Sm), neodymium (Nd) and an oxide thereof.

When the or each second support material (e.g. the platinum support material and/or the palladium support material), or the refractory metal oxide thereof, is doped, then generally the amount of dopant is 0.25 to 2.5% by weight, preferably 0.5 to 1.5% by weight (e.g. about 1% by weight). Each amount in this context refers to the total amount per support material or refractory metal oxide.

The support second material (e.g. the platinum support material and/or the palladium support material) may comprise, or consist essentially of, alumina doped with a dopant. The alumina may be doped with a dopant comprising silicon (Si), magnesium (Mg), barium (Ba), lanthanum (La), cerium (Ce), titanium (Ti), or zirconium (Zr) or a combination of two or more thereof. The dopant may comprises, or consist essentially of, an oxide of silicon, an oxide of magnesium, an oxide of barium, an oxide of lanthanum, an oxide of cerium, an oxide of titanium or an oxide of zirconium. Preferably, the dopant comprises, or consists essentially of, silicon, magnesium, barium, or cerium, or an oxide thereof, particularly silicon, or cerium, or an oxide thereof. More preferably, the dopant comprises, or consists essentially of, silicon, magnesium, or barium, or an oxide thereof; particularly silicon, or magnesium, or an oxide thereof; especially silicon or an oxide thereof.

When the alumina is alumina doped with silica, then the alumina is doped with silica in a total amount of 0.5 to 45% by weight (i.e. % by weight of the alumina), preferably 1 to 40% by weight, more preferably 1.5 to 30% by weight (e.g. 1.5 to 10% by weight), particularly 2.5 to 25% by weight, more particularly 3.5 to 20% by weight (e.g. 5 to 20% by weight), even more preferably 4.5 to 15% by weight. When the alumina is alumina doped with magnesium oxide, then the alumina is doped with magnesium in an amount as defined above or an amount of 1 to 30% by weight (i.e. % by weight of the alumina), preferably 5 to 25% by weight.

When the refractory metal oxide is ceria-alumina or ceria-zirconia, then the ceria-zirconia or the ceria-alumina may consist essentially of 20 to 95% by weight of ceria and 5 to 80% by weight of alumina or zirconia (e.g. 50 to 95% by weight ceria and 5 to 50% by weight alumina or zirconia), preferably 35 to 80% by weight of ceria and 20 to 65% by weight alumina or zirconia (e.g. 55 to 80% by weight ceria and 20 to 45% by weight alumina or zirconia), even more preferably 45 to 75% by weight of ceria and 25 to 55% by weight alumina or zirconia.

The platinum support material typically comprises alumina. It is preferred that the platinum support material comprises, or consists essentially of, alumina (e.g. $\gamma$-$Al_2O_3$) or silica-alumina, wherein the alumina or silica-alumina is optionally doped.

The palladium support material typically comprises, or consists essentially of, a refractory metal oxide. The refractory metal oxide is typically selected from the group consisting of alumina, silica, ceria, titania, zirconia, and a mixed or composite oxide of two or more thereof. For example, the refractory metal oxide may be selected from the group consisting of alumina, silica, titania, zirconia, ceria, silica-alumina, titania-alumina, zirconia-alumina, ceria-alumina, titania-silica, zirconia-silica, zirconia-titania and ceria-zirconia. It is preferred that the refractory metal oxide is selected from alumina, ceria, ceria-alumina and ceria-zirconia, more preferably the refractory metal oxide is selected from ceria and ceria-zirconia.

The second washcoat region may further comprise a catalyst promoter. The catalyst promoter may comprise an alkali metal, an alkali earth metal or a mixture thereof.

When the catalyst promoter comprises an alkali metal, the alkali metal may be selected from the group consisting of lithium (Li), sodium (Na) and potassium (K). It is preferred that the alkali metal is sodium (Na) or potassium (K), more preferably the alkali metal is potassium (K).

When the catalyst promoter comprises an alkaline earth metal, the alkaline earth metal may be selected from the group consisting of magnesium (Mg), calcium (Ca), strontium (Sr) and barium (Ba). It is preferred that the alkaline earth metal is calcium (Ca), strontium (Sr), or barium (Ba), more preferably strontium (Sr) or barium (Ba), and most preferably the alkaline earth metal is barium (Ba).

It is preferred that the catalyst promoter comprises an alkaline earth metal. The catalyst promoter may be an alkaline earth metal compound, such as an oxide of the alkaline earth metal, a hydroxide of the alkaline earth metal or a carbonate of the alkaline earth metal. When the catalyst promoter is an alkaline earth metal compound, then preferably the alkaline earth metal compound consists of an alkaline earth metal cation and an anion (e.g. $CO_3^{2-}$, $OH^-$) or the alkaline earth metal compound is a binary alkaline earth metal compound, such as a binary alkaline earth metal oxide.

When the second washcoat region comprises a catalyst promoter, the second support material (or the refractory metal oxide thereof) may comprise, or consist essentially of, a modified alumina incorporating a heteroatom component. The modified alumina incorporating a heteroatom component generally comprises, or consists essentially of, an alumina doped with a heteroatom component, an alkaline earth metal aluminate or a mixture thereof. It is preferred that the modified alumina incorporating a heteroatom component comprises, or consists essentially of, an alumina doped with a heteroatom component or an alkaline earth metal aluminate.

The alumina doped with a heteroatom component may be selected from the group consisting of alumina doped with silica, alumina doped with magnesium oxide, alumina doped with barium, alumina doped with barium oxide, alumina doped with lanthanum oxide and alumina doped with ceria. It is preferred that the alumina doped with a heteroatom component is selected from the group consisting of alumina doped with silica, alumina doped with lanthanum oxide, alumina doped with ceria and alumina doped with magnesium oxide. More preferably, the alumina doped with a heteroatom component is selected from the group consisting of alumina doped with silica and alumina doped with magnesium oxide. Even more preferably, the alumina doped with a heteroatom component is alumina doped with silica. Alumina doped with a heteroatom component can be prepared using methods known in the art or, for example, by a method described in U.S. Pat. No. 5,045,519.

Typically, the alumina doped with a heteroatom component comprises 0.5 to 45% by weight of the heteroatom component, preferably 1 to 40% by weight of the heteroatom component, more preferably 1.5 to 30% by weight of the heteroatom component, particularly 2.5 to 25% by weight of the heteroatom component. When the alumina doped with a heteroatom component comprises, or consists essentially of, alumina doped with silica, then the alumina is doped with silica in an amount of 0.5 to 45% by weight, preferably 1 to 40% by weight, more preferably 1.5 to 30% by weight (e.g. 1.5 to 10% by weight), particularly 2.5 to 25% by weight, more particularly 3.5 to 20% by weight (e.g. 5 to 20% by weight), even more preferably 4.5 to 15% by weight. When the alumina doped with a heteroatom component comprises, or consists essentially of, alumina doped with magnesium oxide, then the alumina is doped with magnesium in an amount as defined above or an amount of 5 to 30% by weight, preferably 10 to 25% by weight.

Typically, the alkaline earth metal aluminate is magnesium aluminate ($MgAl_2O_4$), calcium aluminate ($CaAl_2O_4$), strontium aluminate ($SrAl_2O_4$), or barium aluminate ($BaAl_2O_4$), or a mixture of two or more thereof. Preferably, the alkaline earth metal aluminate is magnesium aluminate ($MgAl_2O_4$).

Generally, when the heteroatom component comprises, or consists essentially of, an alkaline earth metal, then preferably the alkaline earth metal (i.e. of the catalyst promoter) is different to the heteroatom component. When the second support material comprises an alkaline earth metal aluminate, then the alkaline earth metal of the alkaline earth metal aluminate is different to the alkaline earth metal of the catalyst promoter.

The second washcoat region may further comprise a hydrocarbon adsorbent. The hydrocarbon adsorbent is preferably a zeolite.

When the hydrocarbon adsorbent is a zeolite, then preferably the zeolite is a medium pore zeolite (e.g. a zeolite having a maximum ring size of eight tetrahedral atoms) or a large pore zeolite (e.g. a zeolite having a maximum ring size of ten tetrahedral atoms).

Examples of suitable zeolites or types of zeolite include faujasite, clinoptilolite, mordenite, silicalite, ferrierite, zeolite X, zeolite Y, ultrastable zeolite Y, AEI zeolite, ZSM-5 zeolite, ZSM-12 zeolite, ZSM-20 zeolite, ZSM-34 zeolite, CHA zeolite, SSZ-3 zeolite, SAPO-5 zeolite, offretite, a beta zeolite or a copper CHA zeolite. The zeolite is preferably ZSM-5, a beta zeolite or a Y zeolite.

When the second washcoat region comprises platinum, then the amount of platinum (Pt) is 0.2 to 15% by weight, preferably 0.5 to 10% by weight, more preferably 1 to 9% by weight (e.g. 1.5 to 8% by weight), such as 2 to 7% by weight (e.g. 4 to 6% by weight). The % by weight in this context is with reference to the amount of the second support material (e.g. the platinum support material).

When the second washcoat region comprises platinum, then the amount of platinum is 5 to 300 g ft$^{-3}$, preferably 10 to 250 g ft$^{-3}$ (e.g. 20 to 200 g ft$^{-3}$), more preferably 20 to 175 g ft$^{-3}$ (e.g. 25 to 150 g ft$^{-3}$).

When the second washcoat region comprises palladium, then the amount of palladium (Pd) is 0.2 to 15% by weight, preferably 0.5 to 10% by weight, more preferably 1 to 9% by weight (e.g. 1.5 to 8% by weight), such as 2 to 7% by weight (e.g. 4 to 6% by weight). The % by weight in this context is with reference to the amount of the second support material (e.g. the palladium support material).

When the second washcoat region comprises palladium, then the amount of palladium (Pd) is 5 to 300 g ft$^{-3}$, preferably 10 to 250 g ft$^{-3}$ (e.g. 20 to 200 g ft$^{-3}$), more preferably 20 to 175 g ft$^{-3}$ (e.g. 25 to 150 g ft$^{-3}$).

In the second washcoat region, the mass of platinum (Pt) is preferably greater than the mass of palladium (Pd).

Typically, the second washcoat region comprises an amount of the second support material (e.g. the total amount of platinum support material and palladium support material) of 0.1 to 4.5 g (e.g. 0.25 to 4.0 g in$^{-3}$), preferably 0.5 to 3.0 g in$^{-3}$, more preferably 0.6 to 2.5 g (e.g. 0.75 to 1.5 g in$^{-3}$).

Typically, the second washcoat region comprises an amount of a catalyst promoter, particularly a catalyst promoter comprising an alkaline earth metal, of 0.07 to 5 mol ft$^{-3}$, preferably 0.1 to 4.0 mol ft$^{-3}$, more particularly 0.2 to 3.0 mol ft$^{-3}$ (e.g. 0.25 to 1.0 mol ft$^{-3}$), such as 0.3 to 2.25 mol ft$^{-3}$, especially 0.35 to 2.0 mol ft$^{-3}$, preferably 0.4 to 1.8 mol ft$^{-3}$ (e.g. 0.5 to 1.5 mol ft$^{-3}$).

The ratio of the total mass of catalyst promoter, particularly when the catalyst promoter comprises an alkaline earth metal, to the total mass of the platinum group metal (PGM) component in the second washcoat region is typically 0.25:1 to 20:1 (e.g. 0.3:1 to 20:1). It is preferred that the ratio of the total mass of the catalyst promoter to the total mass of the platinum group metal (PGM) component in the second washcoat region is 0.5:1 to 17:1, more preferably 0.7:1 to 15:1, particularly 1:1 to 10:1, still more preferably 1.5:1 to 7.5:1, and even more preferably 2:1 to 5:1. When platinum (Pt) is present in the second washcoat region, then preferably the total mass of the catalyst promoter is greater than the total mass of the platinum (Pt).

When the second washcoat region comprises a hydrocarbon adsorbent, the total amount of hydrocarbon adsorbent is 0.05 to 3.00 g in$^{-3}$, particularly 0.10 to 2.00 g in$^{-3}$, more particularly 0.2 to 1.0 g in$^{-3}$. For example, the total amount of hydrocarbon adsorbent may be 0.8 to 1.75 g in$^{-3}$, such as 1.0 to 1.5 g in$^3$.

Typically, the oxidation catalyst comprises a total amount of support material (e.g. the support material of the catalyst composition in the first washcoat region and the second support material [the platinum support material and the palladium support material]) of 0.1 to 4.5 g in$^{-3}$ (e.g. 0.25 to 4.2 g in$^{-3}$), preferably 0.2 to 3.8 g in$^{-3}$, such as 0.3 to 3.0 g in$^{-3}$, particularly 0.5 to 2.5 g in$^{-3}$ (e.g. 0.75 to 2.3 g in$^{-3}$), still more preferably 0.6 to 2.0 g in$^{-3}$, and even more preferably 0.75 to 1.75 g in$^3$.

In the oxidation catalyst of the invention, the ratio (by mass) of platinum (Pt) to palladium (Pd) is typically 20:1 to 1.1:1 (e.g. 15:1 to 1.2:1), preferably the ratio is 10:1 to 1.3:1 (e.g. 9:1 to 1.4:1), more preferably 8:1 to 1.5:1, even more preferably 7.5:1 to 1.75:1, such as 6:1 to 2:1, and still more preferably 5.5:1 to 2.5:1 (e.g. 5:1 to 3:1). It is preferred that the ratio (by mass) of platinum (Pt) to palladium (Pd) is typically >2:1 (e.g. >4:1), such as 20:1 to 4:1 (e.g. 20:1 to 4.5:1), particularly 10:1 to 5:1.

Generally, the second washcoat region or the oxidation catalyst does not comprise rhodium. It is preferred that the second washcoat region or the oxidation catalyst does not comprise rhodium, an alkali metal or an alkaline earth metal.

The oxidation catalyst of the invention may be an unused oxidation catalyst. The oxidation catalyst is unused when an exhaust gas from a compression ignition engine has not been passed through the oxidation catalyst.

In the oxidation catalyst of the invention, the first washcoat region and the second washcoat region may be arranged on the substrate in a variety of ways. It is generally preferred that the first washcoat region is arranged or oriented to contact exhaust gas after it has contacted the second washcoat region. Typically, the second washcoat region is arranged or oriented to contact exhaust gas before the first washcoat region. Thus, the second washcoat region may be arranged to contact exhaust gas as it enters the oxidation catalyst and the first washcoat region may be arranged to contact the exhaust gas as it leaves the oxidation catalyst. Examples of such arrangements are described herein.

When the first washcoat region is arranged or oriented to contact exhaust gas after it has contacted the second washcoat region, the oxidation catalyst generally has better NO oxidation activity than when the first washcoat region is arranged or oriented to contact exhaust gas before it has contacted the second washcoat region.

The first washcoat region may be disposed directly on to the substrate (i.e. the first washcoat region is in contact with a surface of the substrate). The second washcoat region may be (a) disposed directly on to the substrate (i.e. the second washcoat region is in contact with a surface of the substrate), and/or (b) in contact with the first washcoat region.

When the second washcoat region is disposed directly on to the substrate, then the second washcoat region may be in contact with the first washcoat region or the first washcoat region and the second washcoat region may be separated (e.g. by an intervening washcoat region, such as a third washcoat region, or by a gap).

The second washcoat region may be disposed directly on to the substrate (i.e. the second washcoat region is in contact with a surface of the substrate). The first washcoat region may be (i) disposed or supported on the second washcoat region, (ii) disposed directly on to the substrate (i.e. the first washcoat region is in contact with a surface of the substrate), and/or (iii) in contact with the second washcoat region.

When the first washcoat region is disposed or supported on the second washcoat region, the first washcoat region may be disposed directly on to the second washcoat region (i.e. the first washcoat region is in contact with a surface of the second washcoat region).

When the first washcoat region is disposed directly on to the substrate, then the first washcoat region may be in contact with the second washcoat region or the second washcoat region and the first washcoat region may be separated (e.g. by an intervening washcoat region, such as the third washcoat region, or by a gap).

In general, it is possible that both the first washcoat region and the second washcoat are not directly disposed on the substrate (i.e. neither the first washcoat region nor the second washcoat region is in contact with a surface of the substrate). Thus, at least one of the first washcoat region and the second washcoat region is disposed or supported on a third washcoat region.

Some oxidation catalysts of the invention are described below where the first washcoat region and the second washcoat region have "zoned" arrangements. For the avoidance of doubt, these arrangements are general features of the oxidation catalyst of the invention and may be combined with the arrangements of the first and second washcoat regions described above.

In a first oxidation catalyst arrangement, the first washcoat region is a first washcoat zone disposed or supported at or near an outlet end of the substrate. The second washcoat region may be disposed or supported upstream of the first washcoat zone. Preferably, the second washcoat region is a second washcoat zone. More preferably, the second washcoat zone is disposed or supported upstream of the first washcoat zone (e.g. at or near an inlet end of the substrate).

In a second oxidation catalyst arrangement, the second washcoat region is a second washcoat zone disposed or supported at an outlet end of the substrate. The first washcoat region may be disposed or supported upstream of the second washcoat zone. Preferably, the first washcoat region is a first washcoat zone. More preferably, the first washcoat zone is disposed or supported upstream of the second washcoat zone (e.g. at or near an inlet end of the substrate).

The first washcoat zone may adjoin the second washcoat zone. Preferably, the first washcoat zone is contact with the second washcoat zone. When the first washcoat zone adjoins the second washcoat zone or the first washcoat zone is in contact with the second washcoat zone, the first washcoat zone and the second washcoat zone may be disposed or supported on the substrate as a layer (e.g. a single layer). Thus, a layer may be formed on the substrate when the first and second washcoat zones adjoin or are in contact with one another.

The first washcoat zone may be separate from the second washcoat zone. Thus, there may be an intervening additional washcoat zone or region (e.g. a third washcoat zone or region) between the first washcoat zone and the second washcoat zone, and/or there may be a gap (e.g. a space) between the first washcoat zone and the second washcoat zone.

The first washcoat zone may overlap the second washcoat zone. Thus, an end portion of the first washcoat zone may be disposed or supported on the second washcoat zone. The first washcoat zone may completely or partly overlap the second washcoat zone.

When the first washcoat zone completely overlaps the second washcoat zone, then typically a surface of the second washcoat zone (normally a surface in the longitudinal plane of the catalyst, i.e. the plane that is perpendicular to the plane of the inlet and outlet ends of the substrate) is completely covered by the first washcoat zone.

Alternatively, the second washcoat zone may overlap the first washcoat zone. Thus, an end portion of the second washcoat zone may be disposed or supported on the first washcoat zone. The second washcoat zone may partly overlap the first washcoat zone.

It is preferred that the first washcoat zone and the second washcoat zone do not substantially overlap.

Typically, the first washcoat zone has a length of 10 to 90% of the length of the substrate (e.g. 10 to 45%), preferably 15 to 75% of the length of the substrate (e.g. 15 to 40%), more preferably 20 to 70% (e.g. 20 to 65%, such as 25 to 45%) of the length of the substrate, still more preferably 25 to 65% (e.g. 25 to 50%).

The second washcoat zone typically has a length of 10 to 90% of the length of the substrate (e.g. 10 to 45%), preferably 15 to 75% of the length of the substrate (e.g. 15 to 40%), more preferably 20 to 70% (e.g. 20 to 65%, such as 25 to 45%) of the length of the substrate, still more preferably 25 to 65% (e.g. 25 to 50%).

Oxidation catalysts of the invention are described below where the first washcoat region and the second washcoat region have "layered" arrangements. For the avoidance of doubt, these arrangements are general features of the oxidation catalyst of the invention and may be combined with any of the arrangements of the first and second washcoat regions described above.

The first washcoat region may be a first washcoat layer and the second washcoat region may be a second washcoat layer. The first washcoat layer and the second washcoat layer may have different lengths, or the first washcoat layer and the second washcoat layer may have about the same length. Generally, the length of the first washcoat layer and the length of the second washcoat layer is each substantially uniform.

Typically, at least one of the first washcoat layer and the second washcoat layer extends for substantially an entire length of the substrate, particularly the entire length of the channels of a substrate monolith. More preferably, the first washcoat layer and the second washcoat layer each extend for substantially an entire length of the substrate.

In a third oxidation catalyst arrangement, the first washcoat layer is disposed or supported on the second washcoat layer, preferably the first washcoat layer is disposed directly on to the second washcoat layer (i.e. the first washcoat layer is in contact with a surface of the second washcoat layer).

When the first washcoat layer is disposed directly on to the second washcoat layer, it is preferred that the entire length of the first washcoat layer is disposed or supported on the second washcoat layer. Thus, the length of the first washcoat layer is less than or equal to the length of the second washcoat layer. More preferably, an end of the first washcoat layer does not extend beyond an end of the second washcoat layer (i.e. the ends or boundaries of the first washcoat layer are within the ends or boundaries of the second washcoat layer).

In the third oxidation catalyst arrangement, the second washcoat layer may be disposed directly on to the substrate (i.e. the second washcoat layer is in contact with a surface of the substrate) and/or the second washcoat layer may be disposed directly on to a third washcoat region. The second washcoat layer may only be disposed directly on to the substrate (i.e. the second washcoat layer is in contact with a surface of the substrate).

In a fourth oxidation catalyst arrangement, the second washcoat layer is disposed or supported on the first washcoat layer. Preferably, the entire length of the second washcoat layer is disposed or supported on the first washcoat layer. Thus, the length of the second washcoat layer is less than or equal to the length of the first washcoat layer. More preferably, an end of the second washcoat layer does not extend beyond an end of the first washcoat layer (i.e. the ends or boundaries of the second washcoat layer are within the ends or boundaries of the first washcoat layer).

In the fourth oxidation catalyst arrangement, the first washcoat layer may be disposed directly on to the substrate (i.e. the first washcoat layer is in contact with a surface of the substrate) and/or first washcoat layer may be disposed directly on to a third washcoat region. The first washcoat layer may only be disposed directly on to the substrate (i.e. the first washcoat layer is in contact with a surface of the substrate).

When the first washcoat region is a first washcoat layer, it is preferred that the first washcoat layer is the topmost washcoat region/layer (i.e. there is no other washcoat region or washcoat layer disposed on the first washcoat layer). When the first washcoat region is a first washcoat zone, it is preferred that the first washcoat zone is the rear most washcoat region/zone (i.e. there is no other washcoat region or washcoat zone disposed downstream of the first washcoat zone).

Substrates for supporting oxidation catalysts for treating an exhaust gas from a compression ignition engine are well known in the art.

The substrate typically has a plurality of channels (e.g. for the exhaust gas to flow through). Generally, the substrate is a ceramic material or a metallic material.

It is preferred that the substrate is made or composed of cordierite ($SiO_2$-$Al_2O_3$-$MgO$), silicon carbide (SiC), Fe—Cr—Al alloy, Ni—Cr—Al alloy, or a stainless steel alloy.

Typically, the substrate is a monolith (also referred to herein as a substrate monolith). Such monoliths are well-known in the art. The substrate monolith may be a flow-through monolith or a filtering monolith.

A flow-through monolith typically comprises a honeycomb monolith (e.g. a metal or ceramic honeycomb monolith) having a plurality of channels extending therethrough, which channels are open at both ends. When the substrate is a flow-through monolith, then the oxidation catalyst of the invention is typically a diesel oxidation catalyst (DOC) or is for use as a diesel oxidation catalyst (DOC).

A filtering monolith generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous structure. When the substrate is a filtering monolith, then the oxidation catalyst of the invention is typically a catalysed soot filter (CSF) or is for use as a catalysed soot filter (CSF).

When the monolith is a filtering monolith, it is preferred that the filtering monolith is a wall-flow filter. In a wall-flow filter, each inlet channel is alternately separated from an outlet channel by a wall of the porous structure and vice versa. It is preferred that the inlet channels and the outlet channels are arranged in a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

In principle, the substrate may be of any shape or size. However, the shape and size of the substrate is usually selected to optimise exposure of the catalytically active materials in the catalyst to the exhaust gas. The substrate may, for example, have a tubular, fibrous or particulate form. Examples of suitable supporting substrates include a substrate of the monolithic honeycomb cordierite type, a substrate of the monolithic honeycomb SiC type, a substrate of the layered fibre or knitted fabric type, a substrate of the foam type, a substrate of the crossflow type, a substrate of the metal wire mesh type, a substrate of the metal porous body type and a substrate of the ceramic particle type.

In general, the oxidation catalyst of the invention is for use as a diesel oxidation catalyst (DOC) or a catalysed soot filter (CSF). In practice, catalyst formulations employed in DOCs and CSFs are similar. Generally, a principle difference between a DOC and a CSF is the substrate onto which the catalyst formulation is coated and the total amount of platinum, palladium and any other catalytically active metals that are coated onto the substrate.

Also provided by the invention is a method of manufacturing an oxidation catalyst. The method comprises the steps of:
(i) preparing a washcoat comprising the catalyst composition of the invention; and
(ii) applying the washcoat to a substrate (e.g. to form a coated substrate).

Methods of making washcoats and applying washcoats onto a substrate are known in the art (see, for example, our WO 99/47260, WO 2007/077462 and WO 2011/080525).

When the oxidation catalyst comprises a first washcoat region and second washcoat region, then generally the method of the invention may comprise:
(i) preparing a first washcoat comprising the catalyst composition of the invention; and
(ii) (a) applying the first washcoat to a substrate to form a first washcoat region;
   (b) applying a second washcoat to a substrate to form a second washcoat region.

In the general method above, step (ii)(a) may be performed before step (ii)(b). Thus, the method may comprise:
(ii) (a) applying the first washcoat to a substrate to form a first washcoat region; and then
   (b) applying a second washcoat to the substrate to form a second washcoat region.

Alternatively, step (ii)(b) in the general method above may be performed before step (ii)(a). The method may comprise:
(ii) (x) applying a second washcoat to the substrate to form a second washcoat region; and then
   (y) applying the first washcoat to the substrate to form a first washcoat region.

The method of manufacturing the oxidation catalyst of the invention may further comprise the step of (iv) drying and/or calcining the substrate coated with the washcoat, such as the substrate coated with the first washcoat and/or the second washcoat. When drying and/or calcining the substrate coated with the washcoat, the substrate is heated to a temperature of 600° C. or less, preferably 500° C. or less.

The invention also provides an exhaust system comprising the oxidation catalyst and an emissions control device.

Typically, the exhaust system may further comprise, or the oxidation catalyst is for use in combination with, at least one emissions control device. The emissions control device may be selected from a diesel particulate filter (DPF), a $NO_x$ storage catalyst (NSC), a lean $NO_x$ catalyst (LNC), a selective catalytic reduction (SCR) catalyst, a diesel oxidation catalyst (DOC), a catalysed soot filter (CSF), a selective catalytic reduction filter (SCRF™) catalyst, an ammonia slip catalyst (ASC) and combinations of two or more thereof. Emissions control devices represented by the terms diesel particulate filters (DPFs), $NO_x$ storage catalysts (NSCs), lean $NO_x$ catalysts (LNCs), selective catalytic reduction (SCR) catalysts, diesel oxidation catalyst (DOCs), catalysed soot filters (CSFs) and selective catalytic reduction filter (SCRF™) catalysts are all well known in the art.

Some of the aforementioned emissions control devices have filtering substrates. An emissions control device having a filtering substrate may be selected from the group consisting of a diesel particulate filter (DPF), a catalysed soot filter (CSF), and a selective catalytic reduction filter (SCRF™) catalyst.

Examples of emissions control devices for use with the oxidation catalyst of the invention or for inclusion in the exhaust system of the invention are provided below.

It is preferred that at least one emissions control device is a selective catalytic reduction (SCR) catalyst or a selective catalytic reduction filter (SCRF™) catalyst.

SCR and SCRF™ catalysts are also well known in the art. When the exhaust system of the invention comprises an SCR catalyst or an SCRF™ catalyst, then the exhaust system may further comprise an injector for injecting a nitrogenous reductant, such as ammonia, or an ammonia precursor, such as urea or ammonium formate, preferably urea, into exhaust gas downstream of the catalyst for oxidising carbon monoxide (CO) and hydrocarbons (HCs) and upstream of the SCR catalyst or the SCRF™ catalyst. Such injector is fluidly linked to a source of such nitrogenous reductant precursor, e.g. a tank thereof, and valve-controlled dosing of the precursor into the exhaust stream is regulated by suitably programmed engine management means and closed loop or open loop feedback provided by sensors monitoring relevant exhaust gas composition. Ammonia can also be generated by heating ammonium carbamate (a solid) and the ammonia generated can be injected into the exhaust gas.

Alternatively or in addition to the injector, ammonia can be generated in situ e.g. during rich regeneration of a NSC disposed upstream of the filter or by contacting a DOC disposed upstream of the filter with engine-derived rich exhaust gas. Thus, the exhaust system may further comprise an engine management means for enriching the exhaust gas with hydrocarbons.

The SCR catalyst or the SCRF™ catalyst may comprise a metal selected from the group consisting of at least one of Cu, Hf, La, Au, In, V, lanthanides and Group VIII transition metals, such as Fe, which metal is supported on a refractory oxide or molecular sieve. The metal is preferably selected from Ce, Fe, Cu and combinations of any two or more thereof, more preferably the metal is Fe or Cu.

The refractory oxide for the SCR catalyst or the SCRF™ catalyst may be selected from the group consisting of $Al_2O_3$, $TiO_2$, $CeO_2$, $SiO_2$, $ZrO_2$ and mixed oxides containing two or more thereof. The non-zeolite catalyst can also include tungsten oxide, e.g. $V_2O_5/WO_3/TiO_2$, $WO_x/CeZrO_2$, $WO_x/ZrO_2$ or $Fe/WO_x/ZrO_2$.

It is particularly preferred when an SCR catalyst, an SCRF™ catalyst or a washcoat thereof comprises at least one molecular sieve, such as an aluminosilicate zeolite or a SAPO. The at least one molecular sieve can be a small, a medium or a large pore molecular sieve, for example. By "small pore molecular sieve" herein we mean molecular sieves containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves are potentially advantageous for use in SCR catalysts—see for example WO 2008/132452.

Preferred molecular sieves with application as SCR catalysts in the present invention are synthetic aluminosilicate zeolite molecular sieves selected from the group consisting of AEI, ZSM-5, ZSM-20, ERI including ZSM-34, mordenite, ferrierite, BEA including Beta, Y, CHA, LEV including Nu-3, MCM-22 and EU-1, preferably AEI or CHA, and having a silica-to-alumina ratio of about 10 to about 50, such as about 15 to about 40.

In a first exhaust system embodiment, the exhaust system comprises the oxidation catalyst of the invention, preferably as a DOC, and a catalysed soot filter (CSF). Such an arrangement may be called a DOC/CSF. This embodiment also relates to the use of the oxidation catalyst for treating an exhaust gas from a compression ignition engine in combination with a catalysed soot filter, preferably wherein the oxidation catalyst is, or is for use as, a diesel oxidation catalyst. The oxidation catalyst is typically followed by (e.g. is upstream of) the catalysed soot filter (CSF). Thus, for example, an outlet of the oxidation catalyst is connected to an inlet of the catalysed soot filter.

The first exhaust system embodiment may further comprise a $NO_x$ storage catalyst (NSC). Thus, the embodiment further relates to the use of the oxidation catalyst for treating an exhaust gas from a compression ignition engine in combination with a $NO_x$ storage catalyst (NSC) and a catalysed soot filter (CSF), preferably wherein the oxidation catalyst is, or is for use as, a diesel oxidation catalyst. Typically the oxidation catalyst is followed by (e.g. is upstream of) the $NO_x$ storage catalyst (NSC), and the $NO_x$ storage catalyst (NSC) is followed by (e.g. is upstream of) the catalysed soot filter (CSF).

Generally, the oxidation catalyst, the $NO_x$ storage catalyst (NSC) and the catalysed soot filter (CSF) are connected in series. Thus, for example, an outlet of the oxidation catalyst is connected to an inlet of the $NO_x$ storage catalyst (NSC), and an outlet of the $NO_x$ storage catalyst (NSC) is connected to an inlet of the catalysed soot filter (CSF). Such an arrangement may be termed a DOC/NSC/CSF.

In a second exhaust system embodiment, the exhaust system comprises a diesel oxidation catalyst and the oxidation catalyst of the invention, preferably as a catalysed soot filter (CSF). This arrangement may also be called a DOC/CSF arrangement. The embodiment further relates to the use of the oxidation catalyst for treating an exhaust gas from a compression ignition engine in combination with a diesel oxidation catalyst (DOC), preferably wherein the oxidation catalyst is, or is for use as, a catalysed soot filter. Typically, the diesel oxidation catalyst (DOC) is followed by (e.g. is upstream of) the oxidation catalyst of the invention. Thus, an outlet of the diesel oxidation catalyst is connected to an inlet of the oxidation catalyst of the invention.

A third exhaust system embodiment relates to an exhaust system comprising the oxidation catalyst of the invention, preferably as a DOC, a catalysed soot filter (CSF) and a selective catalytic reduction (SCR) catalyst. Such an arrangement may be called a DOC/CSF/SCR and is a preferred exhaust system for a light-duty diesel vehicle. This embodiment also relates to the use of the oxidation catalyst for treating an exhaust gas from a compression ignition engine in combination with a catalysed soot filter (CSF) and a selective catalytic reduction (SCR) catalyst, preferably wherein the oxidation catalyst is, or is for use as, a diesel oxidation catalyst. The oxidation catalyst is typically followed by (e.g. is upstream of) the catalysed soot filter (CSF). The catalysed soot filter is typically followed by (e.g. is upstream of) the selective catalytic reduction (SCR) catalyst. A nitrogenous reductant injector may be arranged between the catalysed soot filter (CSF) and the selective catalytic reduction (SCR) catalyst. Thus, the catalysed soot filter (CSF) may be followed by (e.g. is upstream of) a nitrogenous reductant injector, and the nitrogenous reductant injector may be followed by (e.g. is upstream of) the selective catalytic reduction (SCR) catalyst.

A fourth exhaust system embodiment relates to an exhaust system comprising a diesel oxidation catalyst (DOC), the oxidation catalyst of the invention, preferably as a catalysed soot filter (CSF), and a selective catalytic reduction (SCR) catalyst. This is also a DOC/CSF/SCR arrangement. A further aspect of this embodiment relates to the use of the oxidation catalyst for treating an exhaust gas from a compression ignition engine in combination with a diesel oxidation catalyst (DOC) and a selective catalytic reduction (SCR) catalyst, preferably wherein the oxidation catalyst is, or is for use as, a catalysed soot filter (CSF). The diesel oxidation catalyst (DOC) is typically followed by (e.g. is upstream of) the oxidation catalyst of the invention. The oxidation catalyst of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the oxidation catalyst may be followed by (e.g. is upstream of) a nitrogenous reductant injector, and the nitrogenous reductant injector may be followed by (e.g. is upstream of) the selective catalytic reduction (SCR) catalyst.

In a fifth exhaust system embodiment, the exhaust system comprises the oxidation catalyst of the invention, preferably as a DOC, a selective catalytic reduction (SCR) catalyst and either a catalysed soot filter (CSF) or a diesel particulate filter (DPF). The arrangement is either a DOC/SCR/CSF or a DOC/SCR/DPF. This embodiment also relates to the use of the oxidation catalyst for treating an exhaust gas from a compression ignition engine in combination with a selective catalytic reduction (SCR) catalyst and either a catalysed soot filter (CSF) or a diesel particulate filter (DPF), preferably wherein the oxidation catalyst is, or is for use as, a diesel oxidation catalyst.

In the fifth exhaust system embodiment, the oxidation catalyst of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the oxidation catalyst may be followed by (e.g. is upstream of) a nitrogenous reductant injector, and the nitrogenous reductant injector may be followed by (e.g. is upstream of) the selective catalytic reduction (SCR) catalyst. The selective catalytic reduction (SCR) catalyst are followed by (e.g. are upstream of) the catalysed soot filter (CSF) or the diesel particulate filter (DPF).

A sixth exhaust system embodiment comprises the oxidation catalyst of the invention, preferably as a DOC, and a selective catalytic reduction filter (SCRF™) catalyst. Such an arrangement may be called a DOC/SCRF™. This embodiment also relates to the use of the oxidation catalyst for treating an exhaust gas from a compression ignition engine in combination with a selective catalytic reduction filter (SCRF™) catalyst, preferably wherein the oxidation catalyst is, or is for use as, a diesel oxidation catalyst. The oxidation catalyst of the invention is typically followed by (e.g. is upstream of) the selective catalytic reduction filter (SCRF™) catalyst. A nitrogenous reductant injector may be arranged between the oxidation catalyst and the selective catalytic reduction filter (SCRF™) catalyst. Thus, the oxidation catalyst may be followed by (e.g. is upstream of) a nitrogenous reductant injector, and the nitrogenous reductant injector may be followed by (e.g. is upstream of) the selective catalytic reduction filter (SCRF™) catalyst.

In each of the first to sixth exhaust system embodiments described hereinabove that comprise a SCR catalyst (including SCRF™ catalyst), an ASC catalyst can be disposed downstream from the SCR catalyst or the SCRF™ catalyst (i.e. as a separate substrate monolith), or more preferably a zone on a downstream or trailing end of the substrate monolith comprising the SCR catalyst can be used as a support for the ASC.

Another aspect of the invention relates to a vehicle comprising the oxidation catalyst or the exhaust system.

Generally, the compression ignition engine is a diesel engine. The diesel engine may be a homogeneous charge compression ignition (HCCI) engine, a pre-mixed charge compression ignition (PCCI) engine or a low temperature combustion (LTC) engine. It is preferred that the diesel engine is a conventional (i.e. traditional) diesel engine.

The vehicle may be a light-duty diesel vehicle (LDV), such as defined in US or European legislation. A light-duty diesel vehicle typically has a weight of <2840 kg, more preferably a weight of <2610 kg.

In the US, a light-duty diesel vehicle (LDV) refers to a diesel vehicle having a gross weight of ≤8,500 pounds (US lbs). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

Alternatively, the vehicle may be a heavy-duty diesel vehicle (HDV), such as a diesel vehicle having a gross weight of >8,500 pounds (US lbs), as defined in US legislation.

The catalyst composition or the oxidation catalyst of the invention can be used to modulate the content of $NO_x$ in an exhaust gas from a compression ignition engine, such as for a downstream emissions control device.

Any reference to "modulate the $NO_x$ content" as used herein, particularly in relation to method or use aspects of the invention, refers to changing (i.e. adjusting) or maintaining the ratio (in ppm or % volume, typically at the temperature and pressure of the exhaust gas) of $NO:NO_2$ to be within a predefined range at a specific exhaust gas temperature or temperature range.

In general, "modulate the $NO_x$ content" refers to changing or maintaining, preferably changing, the ratio (in ppm or % volume) of $NO:NO_2$ in an exhaust gas, typically directly from the compression ignition engine, to be less than 17:3 (i.e. the amount of NO to $NO_2$ is less than that which is normally found in an exhaust gas from a compression ignition engine), preferably to be from 5:1 to 1:5, more preferably 2.5:1 to 1:2.5, and even more preferably 2:1 to 1:2 (e.g. 1.5:1 to 1:1.5 or about 1:1).

In a method of modulating the content of $NO_x$ in an exhaust gas from a compression ignition engine of the invention, the step of (b) passing the treated exhaust gas to an emissions control device typically involves directly passing the treated exhaust gas to the emissions control device. Thus, an outlet of the oxidation catalyst is directly connected (e.g. without intermediary) to an inlet of the emissions control device.

The emissions control device is as defined above. Typically the emissions control device is a selective catalytic reduction (SCR) catalyst, a selective catalytic reduction filter (SCRF™) catalyst, a diesel particulate filter (DPF), or a catalysed soot filter (CSF).

When the catalyst composition or the oxidation catalyst of the invention is used in the regeneration of an emissions control device having a filtering substrate, it may be used in the active or passive regeneration of the emissions control device, preferably the active regeneration. Typically, the emissions control device having a filtering substrate is downstream of the oxidation catalyst.

The emissions control device having a filtering substrate may be selected from the group consisting of a diesel particulate filter (DPF), a catalysed soot filter (CSF), a selective catalytic reduction filter (SCRF™) catalyst and a combination of two or more thereof.

The catalyst composition or the oxidation catalyst may be used to regenerate the emissions control device having a filtering substrate at a temperature of at least 220° C., preferably at least 240° C., more preferably at least 260° C., still more preferably at least 280° C., by oxidising nitric oxide (NO) to nitrogen dioxide ($NO_2$).

DEFINITIONS

Any reference to "disposed" or "supported" on a support material as used herein, particularly with reference to a chemical entity, such as a metal compound (e.g. platinum compound, palladium compound) or a metal in an elemental form (e.g. platinum or palladium in an elemental form), refers to the chemical entity being dispersed over a surface of the support material and/or impregnated into the support material (e.g. impregnated into pores of the support material). In general, the reference to "disposed" or "supported" refers to a chemical entity that is disposed directly onto or is directly supported by the support material (e.g. there is no intervening material between the chemical entity and the support material).

Any reference to "stably generate $NO_2$" or "stably produce $NO_2$" is synonymous with "stably oxidising NO". It is to be understood that a catalyst composition "stably generates" or "stably produces" $NO_2$ when the variation of $\Delta NO_{2\ (from\ fresh)}$ [e.g. when measured between a "fresh" state (i.e. the catalyst composition is unused prior to testing) and an aged state at an exhaust gas temperature of about 250° C.] is less than 20%, preferably less than 10%, more preferably less than 5%.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The term "washcoat" is well known in the art and refers to an adherent coating that is applied to a substrate usually during production of a catalyst.

The term "washcoat region" as used herein refers to an area of washcoat on a substrate. A "washcoat region" can, for example, be disposed or supported on a substrate as a "layer" or a "zone". The area or arrangement of a washcoat on a substrate is generally controlled during the process of applying the washcoat to the substrate. The "washcoat region" typically has distinct boundaries or edges (i.e. it is possible to distinguish one washcoat region from another washcoat region using conventional analytical techniques).

It is preferable that each "washcoat region" has a substantially uniform composition (i.e. there is no substantial difference in the composition of the washcoat when comparing one part of the washcoat region with another part of that washcoat region). Substantially uniform composition in this context refers to a material (e.g. washcoat region) where the difference in composition when comparing one part of the washcoat region with another part of the washcoat region is 5% or less, usually 2.5% or less, and most commonly 1% or less.

The term "washcoat zone" as used herein refers to a washcoat region of substantially uniform length. The length of a washcoat zone may be the same as the total length of the substrate. In general, the length of a washcoat zone is less than the total length of the substrate. The total length of a substrate is the distance between its inlet end and its outlet end (e.g. the opposing ends of the substrate). A "washcoat zone" typically has a length (i.e. a substantially uniform length) of at least 5% of the total length of the substrate.

Any reference to a "substantially uniform" in the context of a length or to "substantially uniform length" as used herein refers to a length that does not deviate by more than 10%, preferably does not deviate by more than 5%, more preferably does not deviate by more than 1%, from its mean value.

Any reference to a "washcoat zone disposed at an inlet end of the substrate" used herein refers to a washcoat zone disposed or supported on a substrate that is nearer to an inlet end of the substrate than it is to an outlet end of the substrate. Thus, the midpoint of the washcoat zone (i.e. at half its length) is nearer to the inlet end of the substrate than the midpoint is to the outlet end of the substrate. Similarly, any reference to a "washcoat zone disposed at an outlet end of the substrate" used herein refers to a washcoat zone disposed or supported on a substrate that is nearer to an outlet end of the substrate than it is to an inlet end of the substrate. Thus, the midpoint washcoat zone (i.e. at half its length) is nearer to the outlet end of the substrate than the midpoint is to the inlet end of the substrate.

When the substrate is a wall-flow filter, then generally any reference to a "washcoat zone disposed at an inlet end of the substrate" refers to a washcoat zone disposed or supported on the substrate that is (a) nearer to an inlet end of an inlet channel of the substrate than it is to a closed end of the inlet channel, and/or (b) nearer to a closed end of an outlet channel of the substrate than it is to an outlet end of the outlet channel. Thus, the midpoint of the washcoat zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel. Similarly, any reference to a "washcoat zone disposed at an outlet end of the substrate" when the substrate is a wall-flow filter refers to a washcoat zone disposed or supported on the substrate that is (a) nearer to an outlet end of an outlet channel of the substrate than it is to a closed end of the outlet channel, and/or (b) nearer to a closed end of an inlet channel of the substrate than it is to an inlet end of the inlet channel. Thus, the midpoint of the washcoat zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

Any reference to washcoat zones that do not "substantially overlap" as used herein refers an overlap (i.e. between the ends of neighbouring zones on a substrate) of less than 10% of the length of the substrate, preferably less 7.5% of the length of the substrate, more preferably less than 5% of the length of the substrate, particularly less than 2.5% of the length of the substrate, even more preferably less than 1% of the length of the substrate, and most preferably there is no overlap.

EXAMPLES

The invention will now be illustrated by the following non-limiting examples.

Example 1

Silica-alumina powder is impregnated with a calculated volume of platinum nitrate solution by an incipient wetness method. The powder is then dried for 8 hours. The resulting Pt impregnated powder is suspended in water and reduced with an aqueous hydrazine solution at 55° C. The resulting slurry is filtered, dried for 2 hours, and then calcined at 800° C. for 1 hour to produce a thermally treated Pt powder.

The thermally treated Pt powder is slurried in water and milled to a $d_{90}$ of <20 micron. The resulting washcoat is applied to a cordierite flow through monolith having 400 cells per square inch using established coating techniques. The part (i.e. oxidation catalyst) is then dried and calcined at 500° C. The finished part has a Pt loading of 37.5 g/ft³.

Example 2

The preparative method for preparing a part in Example 1 is repeated except that the thermally treated Pt powder is obtained by calcining at a higher temperature of 850° C. for 1 hour (instead of 800° C. for 1 hour in Example 1).

Example 3

The preparative method for preparing a part in Example 1 is repeated except that the thermally treated Pt powder is obtained by calcining at a higher temperature of 900° C. for 1 hour (instead of 800° C. for 1 hour in Example 1).

Example 4

Alumina powder is impregnated with a calculated volume of platinum nitrate solution by an incipient wetness method. The powder is then dried for 8 hours. The resulting Pt impregnated powder is suspended in water and reduced with an aqueous hydrazine solution at 55° C. The resulting slurry is filtered and then dried at 100° C. The resulting powder has a Pt loading of 8 wt %.

Example 5

The preparative method of Example 4 is repeated, except that a reduction step with aqueous hydrazine is not carried out on the powder. The resulting powder has a Pt loading of 8 wt %.

EXPERIMENTAL DETAILS

Measurement of NO Oxidation

Core samples are taken from the oxidation catalyst of Examples 1, 2 and 3. All of the cores were hydrothermally "aged" in an oven at 790° C. for 16 hours. Additional cores are taken from the oxidation catalyst of Examples 1, 2 and 3 and kept in a "fresh" condition (i.e. they are kept without any thermal treatment in an oven).

Catalytic activity is determined using a synthetic gas bench activity test. The fresh and aged cores are tested in a simulated catalyst activity testing (SCAT) gas apparatus using the inlet gas mixtures in Table 1. In each case the balance is nitrogen.

TABLE 1

| | |
|---|---|
| CO | 1500 ppm |
| HC (as $C_1$) | 430 ppm |
| NO | 100 ppm |
| $CO_2$ | 4% |
| $H_2O$ | 4% |
| $O_2$ | 14% |
| Space velocity | 55000/hour |

Measurement of Mean Pt Crystallite Size

Samples of the calcined Pt powders from the oxidation catalysts of Examples 1, 2 and 3 are analysed by X-ray diffraction (using PANalytical X'Pert Pro). Rietveld refinement of the diffraction pattern is performed and the Pt crystallite size is determined using X'Pert HighScore Plus software (PANalytical).

Samples of the Pt powder from Examples 4 and 5 are analysed at various temperatures using in situ XRD (Bruker AXS). Rietveld refinement of the diffraction pattern is performed and the Pt crystallite size is determined using the Double-Voigt approach as implemented in the program TOPAS (Bruker AXS) to extract peak width parameters. The samples are measured at 30° C. and then between 450° C. and 800° C. in 50° C. steps (heating rate of 6° C./minute). A dwell time of 60 minutes is spent at each temperature point prior to XRD measurement. Once the final data set is collected at 800° C. the samples are cooled to 30° C. and a final XRD pattern is collected.

Results

The results in Table 2 show the NO oxidation performance of Examples 1, 2 and 3 at 300° C.

TABLE 2

| Example | NO oxidation at 300° C. (%) | |
|---|---|---|
| No. | fresh condition | aged condition |
| 1 | 48 | 27 |
| 2 | 42 | 27 |
| 3 | 30 | 27 |

Example 1 has the highest NO oxidation activity. Example 2 has the intermediate NO oxidation activity. Example 3 has the lowest NO oxidation activity. After hydrothermal ageing at 790° C. for 16 hours, Examples 1, 2 and 3 all have the same NO oxidation activity. Example 1 underwent the greatest change in NO oxidation activity. Example 3 underwent the smallest change in NO oxidation performance and shows the greatest stability toward NO oxidation.

The results in Table 3 show the average Pt crystallite size in nanometres (nm) determined by XRD.

TABLE 3

| Example No. | Average Pt crystallite size (nm) [aged condition] |
|---|---|
| 1 | 20 |
| 2 | 19 |
| 3 | 20 |

In a fresh condition, Example 1 had the smallest crystallite size; Example 2 had an intermediate Pt crystallite size; and Example 3 had the largest Pt crystallite size. After hydrothermal ageing at 790° C. for 16 hours, Examples 1, 2 and 3 all have approximately the same average Pt crystallite size of 19-20 nm. Example 1 underwent the largest change in Pt crystallite size. Example 3 underwent the smallest change in Pt crystallite size.

FIG. 1 shows some in situ XRD diffraction patterns for the Pt powder of Example 4 (prepared using a method according to the invention, which includes a reduction step). Diffraction peaks from Pt crystallites are seen at all temperatures. The peak sharpens as the size of the Pt crystallites increase. The mean Pt crystallite size is determined using the LVol-IB implementation in TOPAS for each diffraction pattern.

Figure 2:
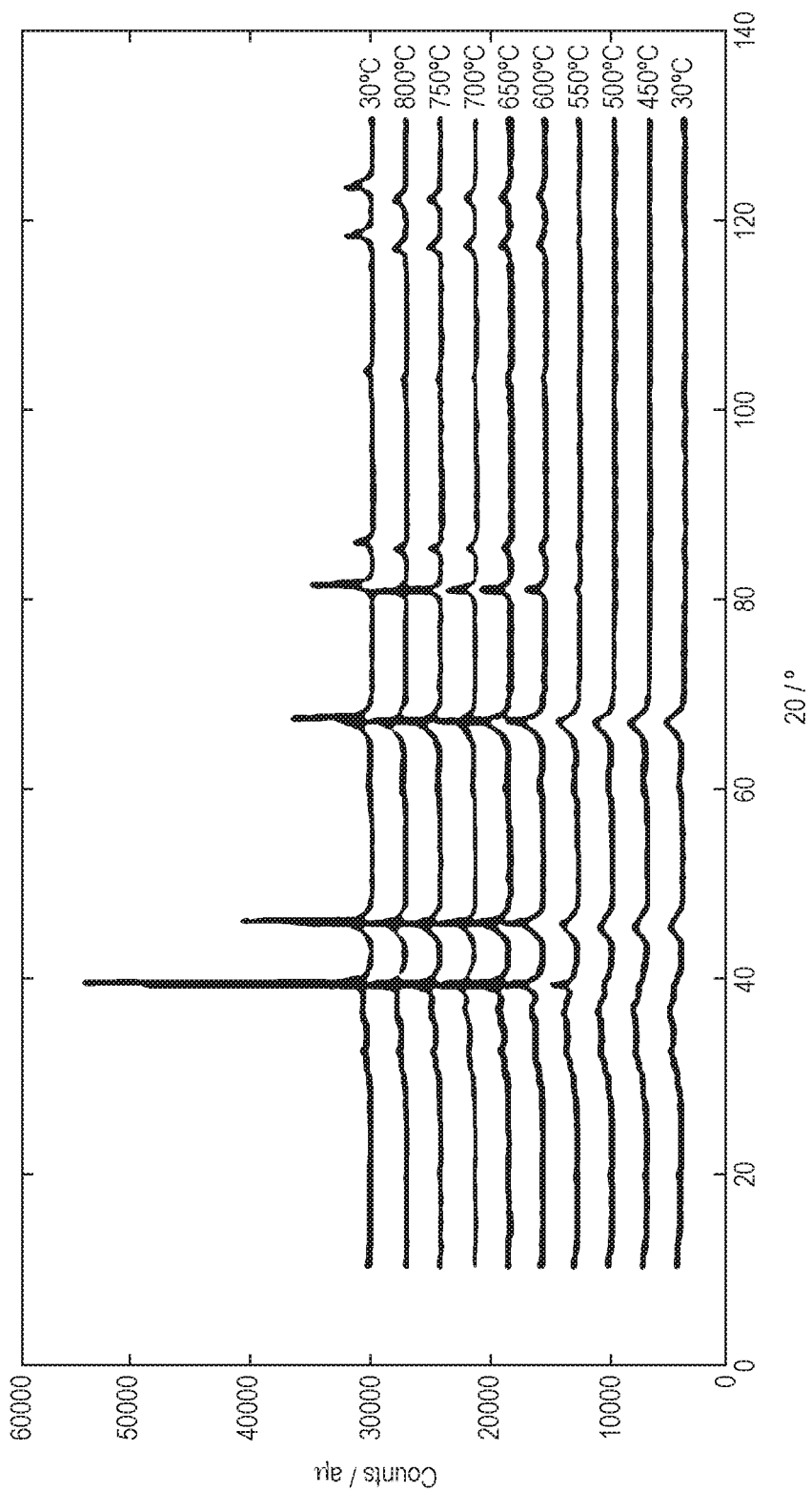
FIG. 2 shows XRD diffractogram at various temperatures (at 30° C., 450° C., 500° C., 550° C., 600° C., 650° C., 700° C., 750° C., 800° C. and then 30° C.) for the catalyst composition of Example 5.

FIG. 2 shows some in situ XRD diffraction patterns for the Pt powder of Example 5 (prepared using a method without a reduction step). Diffraction peaks from Pt crystallites are seen after elevated temperatures (e.g. above 600° C.). The peak sharpens as the size of the Pt crystallites increase. The mean Pt crystallite size is determined using the LVol-IB implementation in TOPAS for each diffraction pattern.

Figure 3:
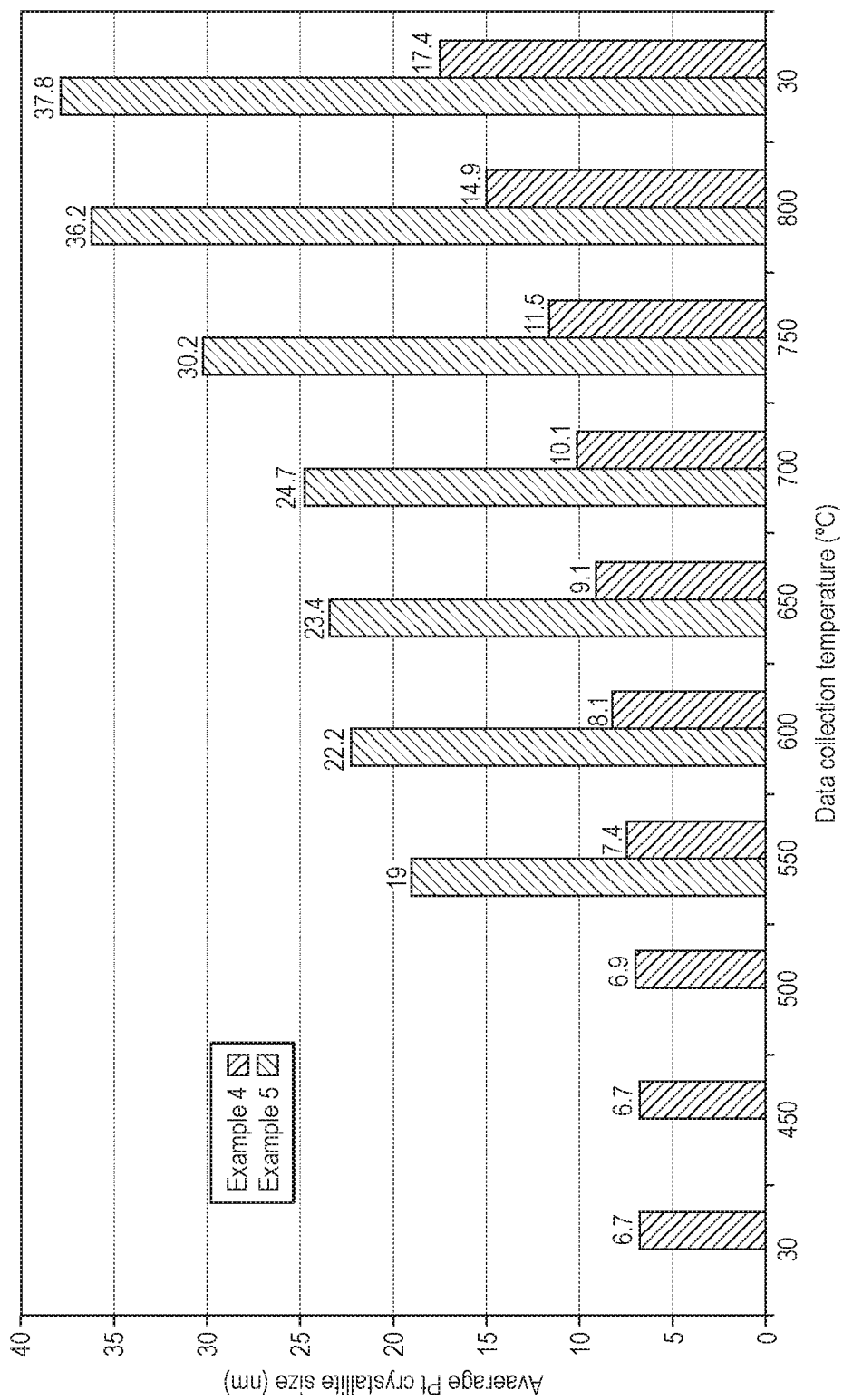
FIG. 3 is a histogram showing the average (mean) Pt crystallite size of Examples 4 and 5 at various temperatures (at 30° C., 450° C., 500° C., 550° C., 600° C., 650° C., 700° C., 750° C., 800° C. and then 30° C.).

FIG. 3 shows the apparent mean Pt crystallite sizes for the Pt powder of Examples 4 and 5 that were obtained from the XRD data collected at various temperatures (shown in FIGS. 2 and 3). Example 4 shows a relatively stable mean Pt crystallite size across the range of temperatures. Example 5 shows a greater increase in the mean Pt crystallite size at temperatures above 550° C. compared to Example 4. This indicates that Example 4 is a more stable catalyst powder compared to Example 5.

For the avoidance of any doubt, the entire content of any and all documents cited herein is incorporated by reference into the present application.

The invention claimed is:

1. An oxidation catalyst comprising a mass ratio of platinum (Pt) to palladium (Pd) of 20:1 to 1.1:1, which oxidation catalyst comprising:
   a first washcoat layer;
   a second washcoat layer; and
   a flow-through monolith substrate;
   wherein the first washcoat layer and the second washcoat layer are disposed on the substrate, wherein the first washcoat layer is disposed on the second washcoat layer, and wherein the first washcoat layer comprises a catalyst composition comprising (a) Pt as the only platinum group metal (PGM) and having a mean crystallite size in a range of from 10 to 35 nm that is disposed or supported on particles of a first refractory oxide comprising alumina doped with silicon (Si) in a total amount of 0.5 to 45% by weight, wherein the platinum is highly dispersed over the first refractory oxide particle surface; and (b) particles of a second refractory oxide, wherein the second refractory oxide particles are free of PGMs; and the second washcoat layer comprises a second platinum group metal (PGM), which is a combination of Pt and Pd, wherein the mass of Pt is greater than the mass of Pd, a catalyst promoter, which is barium, and a second support material.

2. An exhaust system for a compression ignition engine comprising an oxidation catalyst of claim 1 and an emissions control device.

3. An exhaust system according to claim 2, wherein the emissions control device is a selective catalytic reduction (SCR) catalyst or a selective catalytic reduction filter catalyst.

4. An oxidation catalyst according to claim 1, wherein the second refractory oxide comprises alumina, silica, ceria, titania, zirconia, or a mixed or composite oxide thereof.

5. An oxidation catalyst according to claim 1, wherein the first and second refractory oxides are compositionally different.

6. An oxidation catalyst according to claim 1, wherein the catalyst composition comprises 40% by weight or more of the second refractory oxide.

7. An oxidation catalyst according to claim 1, wherein the catalyst composition comprises 0.2% by weight or more of platinum.

8. A method of treating exhaust gas from a compression ignition engine, the method comprising contacting the exhaust gas with the oxidation catalyst of claim 1.

9. An oxidation catalyst according to claim 1, wherein second washcoat layer comprises a hydrocarbon adsorbent, which is a zeolite.

* * * * *